United States Patent
Yamamoto

(10) Patent No.: US 9,811,741 B2
(45) Date of Patent: Nov. 7, 2017

(54) OBJECT DETECTOR

(71) Applicant: FUJITSU TEN LIMITED, Kobe-shi, Hyogo (JP)

(72) Inventor: Tetsuo Yamamoto, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 588 days.

(21) Appl. No.: 14/155,931

(22) Filed: Jan. 15, 2014

(65) Prior Publication Data

US 2014/0211007 A1    Jul. 31, 2014

(30) Foreign Application Priority Data

Jan. 28, 2013  (JP) ................................. 2013-012787

(51) Int. Cl.
*G06K 9/00* (2006.01)

(52) U.S. Cl.
CPC ................................ *G06K 9/00791* (2013.01)

(58) Field of Classification Search
CPC .... G06K 9/00791; G06K 9/4604; B60Q 1/08; B60Q 1/143; B60R 11/04; B60R 2021/01259; B60R 21/0134; B60R 2300/8093; G06T 2207/30256; G06T 2207/30261; G08G 1/16; B60T 2201/08; B60T 2201/089

See application file for complete search history.

(56) References Cited

U.S. PATENT DOCUMENTS

| | | | |
|---|---|---|---|
| 7,570,198 B2 * | 8/2009 | Tokoro | G01S 7/4004 342/70 |
| 2004/0016870 A1 * | 1/2004 | Pawlicki | G06T 7/13 250/208.1 |
| 2004/0119823 A1 * | 6/2004 | Takagi | H04N 7/181 348/148 |
| 2006/0115121 A1 * | 6/2006 | Saka | G06T 7/0002 382/104 |

(Continued)

FOREIGN PATENT DOCUMENTS

| | | |
|---|---|---|
| JP | A-10-222665 | 8/1998 |
| JP | 2005-276056 A | 10/2005 |

(Continued)

OTHER PUBLICATIONS

S. S. Beauchemin; J. L. Barron (1995). The computation of optical flow. ACM New York, USA.*

(Continued)

*Primary Examiner* — Neil Mikeska
(74) *Attorney, Agent, or Firm* — Oliff PLC

(57) ABSTRACT

An object detection circuit detects an object moving in a periphery of a vehicle by use of a shot image. A state judgment part changes a parameter relevant to a detection function so as to change whether the detection function of the object detection circuit is to be enabled or disabled while the object detection circuit is kept activated. Thus, even when the detection function of the object detection circuit is disabled, the object detection circuit is kept activated. Therefore, since there is no need to restart the object detection circuit in order to enable the detection function of the object detection circuit, a detection result by the object detection circuit is promptly obtained.

12 Claims, 19 Drawing Sheets

(56) References Cited

U.S. PATENT DOCUMENTS

| | | | | |
|---|---|---|---|---|
| 2006/0187304 A1* | 8/2006 | Sakata | H04N 7/181 | 348/148 |
| 2006/0206243 A1* | 9/2006 | Pawlicki | G06K 9/4604 | 701/1 |
| 2007/0206833 A1* | 9/2007 | Otsuka | B60R 21/0134 | 382/103 |
| 2008/0189000 A1* | 8/2008 | Duong | B60T 7/22 | 701/20 |
| 2009/0058622 A1* | 3/2009 | Hsieh | B60Q 9/008 | 340/435 |
| 2009/0171536 A1* | 7/2009 | Zimmer | B60R 21/0134 | 701/49 |
| 2009/0225173 A1* | 9/2009 | Ogawa | G06K 9/00362 | 348/207.99 |
| 2009/0251333 A1* | 10/2009 | Itani | G01C 21/36 | 340/932.2 |
| 2010/0020170 A1* | 1/2010 | Higgins-Luthman | B60Q 1/1423 | 348/135 |
| 2010/0097470 A1* | 4/2010 | Yoshida | G08B 13/19641 | 348/159 |
| 2010/0157064 A1* | 6/2010 | Cheng | G06K 9/00771 | 348/169 |
| 2011/0025489 A1* | 2/2011 | Shimoda | B60R 1/00 | 340/459 |
| 2011/0128138 A1* | 6/2011 | Yamamoto | B60W 30/0956 | 340/436 |
| 2011/0280026 A1* | 11/2011 | Higgins-Luthman | B60Q 1/143 | 362/466 |
| 2012/0140072 A1* | 6/2012 | Murashita | G06K 9/00805 | 348/148 |
| 2012/0147188 A1* | 6/2012 | Yokochi | B60R 1/00 | 348/148 |
| 2012/0212353 A1* | 8/2012 | Fung | B60K 28/06 | 340/905 |
| 2012/0218412 A1* | 8/2012 | Dellantoni | G01C 21/3602 | 348/148 |
| 2012/0249791 A1* | 10/2012 | Shen | H04N 7/181 | 348/148 |
| 2012/0253628 A1* | 10/2012 | Maruyama | B60W 50/085 | 701/93 |
| 2014/0218529 A1* | 8/2014 | Mahmoud | H04N 7/181 | 348/148 |

FOREIGN PATENT DOCUMENTS

| | | |
|---|---|---|
| JP | A-2005-316746 | 11/2005 |
| JP | 2006-224873 A | 8/2006 |
| JP | A-2006-215642 | 8/2006 |
| JP | 2008-087618 A | 4/2008 |
| JP | 2008-276308 A | 11/2008 |
| JP | A-2009-277021 | 11/2009 |
| JP | A-2010-264828 | 11/2010 |

OTHER PUBLICATIONS

May 24, 2016 Office Action issued in Japanese Patent Application No. 2013-012787.

Jan. 10, 2017 Office Action issued in Japanese Application No. 2013-012787.

* cited by examiner

OBJECT DETECTOR

BACKGROUND OF THE INVENTION

Field of the Invention

The invention relates to a technology for detecting an object moving in the periphery of a vehicle.

Description of the Background Art

Conventionally, object detection systems each of which detects an object by use of the shot image of the periphery of a vehicle captured by a camera have been proposed. In an example, an object detection system detects an object based on the shot image captured by a front camera, and displays on a display an indication or the like that shows the detected result. By use of such an object detection system, a user (mainly a driver) can easily perceive the object such as another vehicle approaching from the location that the user cannot see at an intersection with a poor view, a parking area or the like.

A frame correlation method that uses a plurality of shot images captured at successive times is known as a method for detecting an object on such an object detection system. In an example, an optical flow method that is one of the frame correlation methods extracts feature points from each of the plurality of shot images (frames), and then detects an object based on the directions of the optical flows that show the move of the feature points among the plurality of shot images.

The frame correlation method described above, however, has the characteristics that it is more difficult to detect an object accurately when the vehicle where the object detection system is installed is running at a relatively high velocity or turning. Therefore, a conventional object detection system stops the operation of a detector such as ASIC that detects an object so as to disable the detection function when detection accuracy is not ensured based on the velocity or the steering angle of the vehicle.

However, once the operation of the detector is stopped, restarting the detector is needed when the detection function is again enabled. In general, such restarting the detector requires a certain period of time (approximately one second) as an initialization processing. Therefore, there may be a case that the detection result by the detector is not obtained even when the object detection is needed.

SUMMARY OF THE INVENTION

According to one aspect of the invention, an object detector includes: a detector that detects, by use of a shot image of a periphery of a vehicle captured by a camera, an object moving in the periphery of the vehicle; and a controller that (i) acquires information about a vehicle state of the vehicle, and (ii) changes whether a detection function of the detector is to be enabled or disabled in accordance with the vehicle state by changing a parameter relevant to the detection function so as to change whether the detection function is to be enabled or disabled while keeping the detector activated.

Even when the detection function of the detector is disabled, the detector is kept activated. Thus, since there is no need to restart the detector in order to enable the detection function of the detector, a detection result by the detector is promptly obtained.

According to another aspect of the invention, the detector detects the object when a derived value that is derived from the shot image exceeds a threshold, and the controller changes the threshold to a maximum value to disable the detection function.

Simply changing the threshold allows for easily disabling the detection function of the detector while keeping the detector activated.

Therefore, the object of the invention is to promptly obtain a detection result by a detector when a detection function of the detector is enabled.

These and other objects, features, aspects and advantages of the invention will become more apparent from the following detailed description of the invention when taken in conjunction with the accompanying drawings.

DESCRIPTION OF THE EMBODIMENTS

Hereinafter, some embodiments of the invention are described with reference to attached drawings.

1. First Embodiment

<1-1. Configuration of System>

Figure 1:
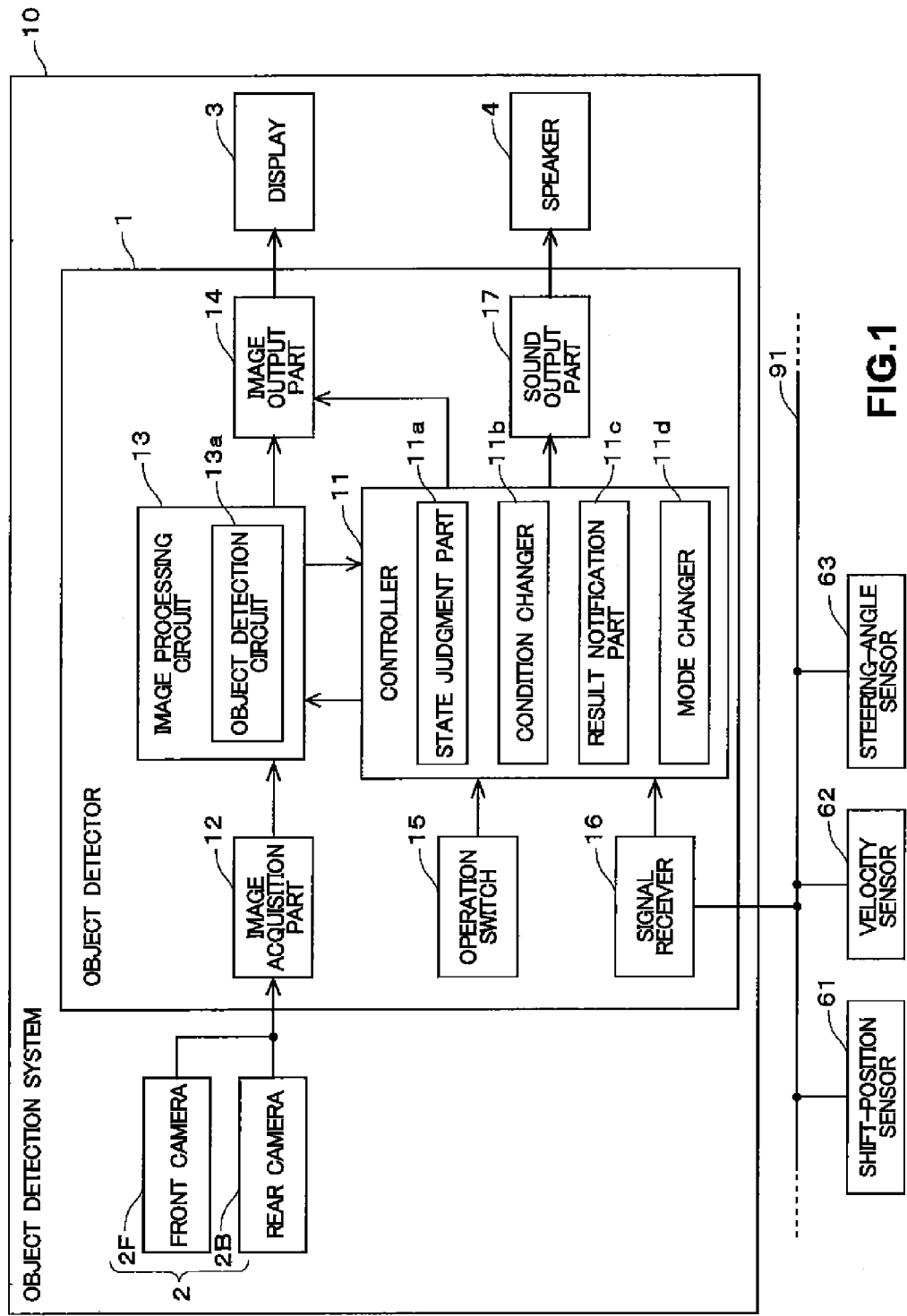
FIG. 1 shows a schematic configuration of an object detection system of the first embodiment.

FIG. 1 shows a schematic configuration of an object detection system 10 of the embodiment. The object detection system 10 for installation in a vehicle such as a car has a function for detecting an object moving in the periphery of the vehicle, and then informing a user of the result of a detected object, if any. Hereafter, the vehicle equipped with the object detection system 10 is referred to as "own vehicle."

The object detection system 10 includes a display 3 that displays a shot image and a speaker 4 that generates sound. The display 3 is located at a position that a user (primarily a driver) can see in a vehicle cabin of the own vehicle to inform the user of various types of information. The display 3 may have a navigation function for providing route guidance to a destination, and/or a touch panel function for receiving a user operation. The speaker 4 is located in the vehicle cabin of the own vehicle to inform the user of information with sound.

The object detection system 10 further includes a plurality of cameras 2 each of which captures a shot image by photographing the periphery of the own vehicle. Each of the plurality of cameras 2 having a lens and an image sensor captures a shot image electronically. Each of the plurality of cameras 2 repeats capturing shot images at predetermined intervals (for example, at intervals of 1/30 second).

Figure 2:
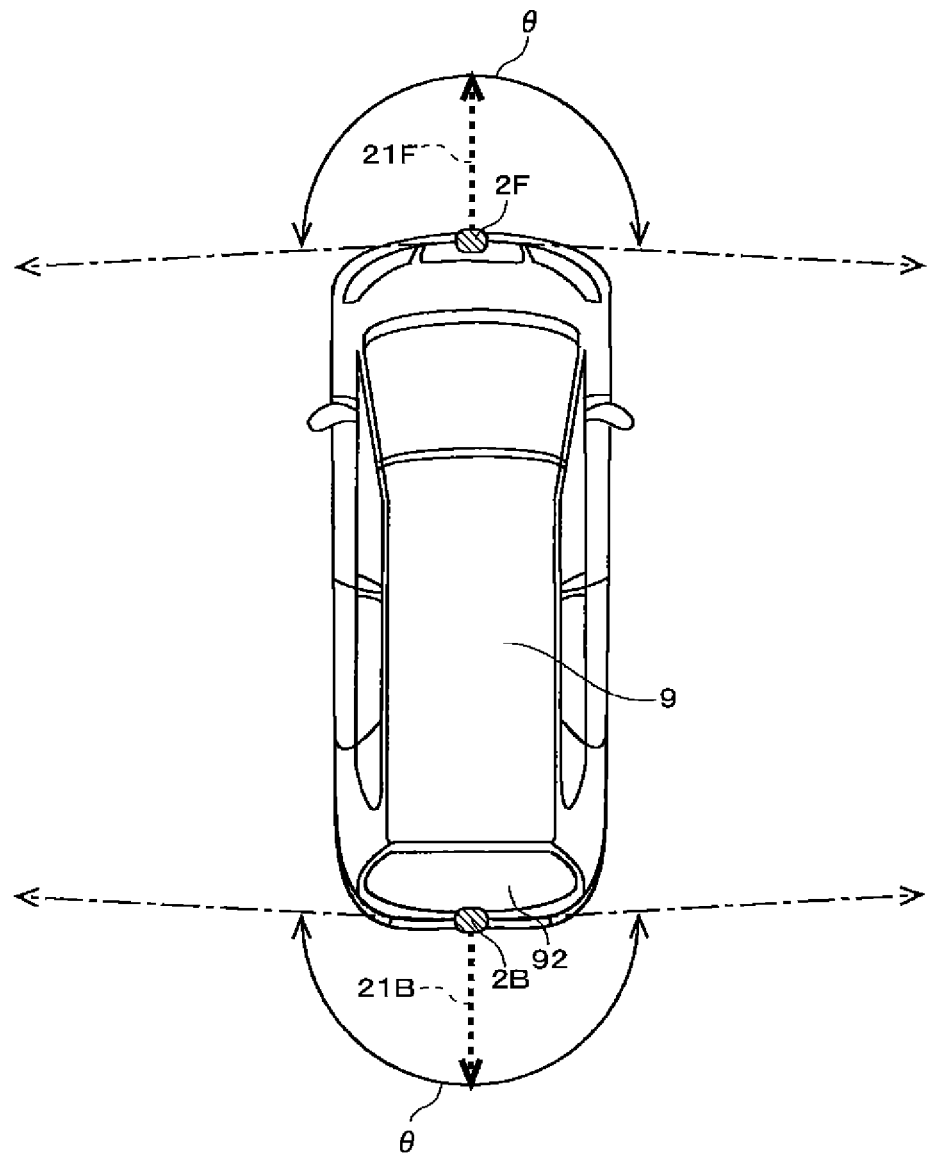
FIG. 2 shows the respective photographing directions of two cameras.

The plurality of cameras 2 include a front camera 2F and a rear camera 2B. FIG. 2 shows the respective photographing directions of the front camera 2F and the rear camera 2B.

As shown in the figure, the front camera 2F is disposed on the front-end bumper of an own vehicle 9 with an optical axis 21F of the front camera 2F set at the angle pointing a forward direction along the front-back direction of the own vehicle 9. Thus, the front camera 2F captures the shot images showing the forward area of the own vehicle 9 by photographing the forward area of the own vehicle 9. The rear camera 2B is disposed on a rear door 92 of the rear end of the own vehicle 9 with an optical axis 21B of the rear camera 2B set at the angle pointing a backward direction along the front-back direction of the own vehicle 9. Thus, the rear camera 2B captures the shot images showing the rear area of the own vehicle 9 by photographing the rear area of the own vehicle 9.

Each of the plurality of cameras 2 using a fish-eye lens has field angle θ of 180 degrees or more. Therefore, the front camera 2F is capable of photographing the area that spreads forward from the own vehicle 9 with 180 degrees or more in the right-left direction. The rear camera 2B is capable of photographing the area that spreads backward from the own vehicle 9 with 180 degrees or more in the right-left direction.

The object detection system 10 displays one of the shot images captured by the cameras 2 on the display 3. This allows the user to check the peripheral area of the own vehicle 9 in a substantially real time. Further, the object detection system 10 detects an object approaching the own vehicle 9 based on the shot image captured by one of the cameras 2. When having detected the object, the object detection system 10 informs the user of the detected result via the display 3 and the speaker 4. This allows the user easily to perceive the object approaching from the location that the user cannot see at an intersection with a poor view, a parking area or the like.

Figure 3:
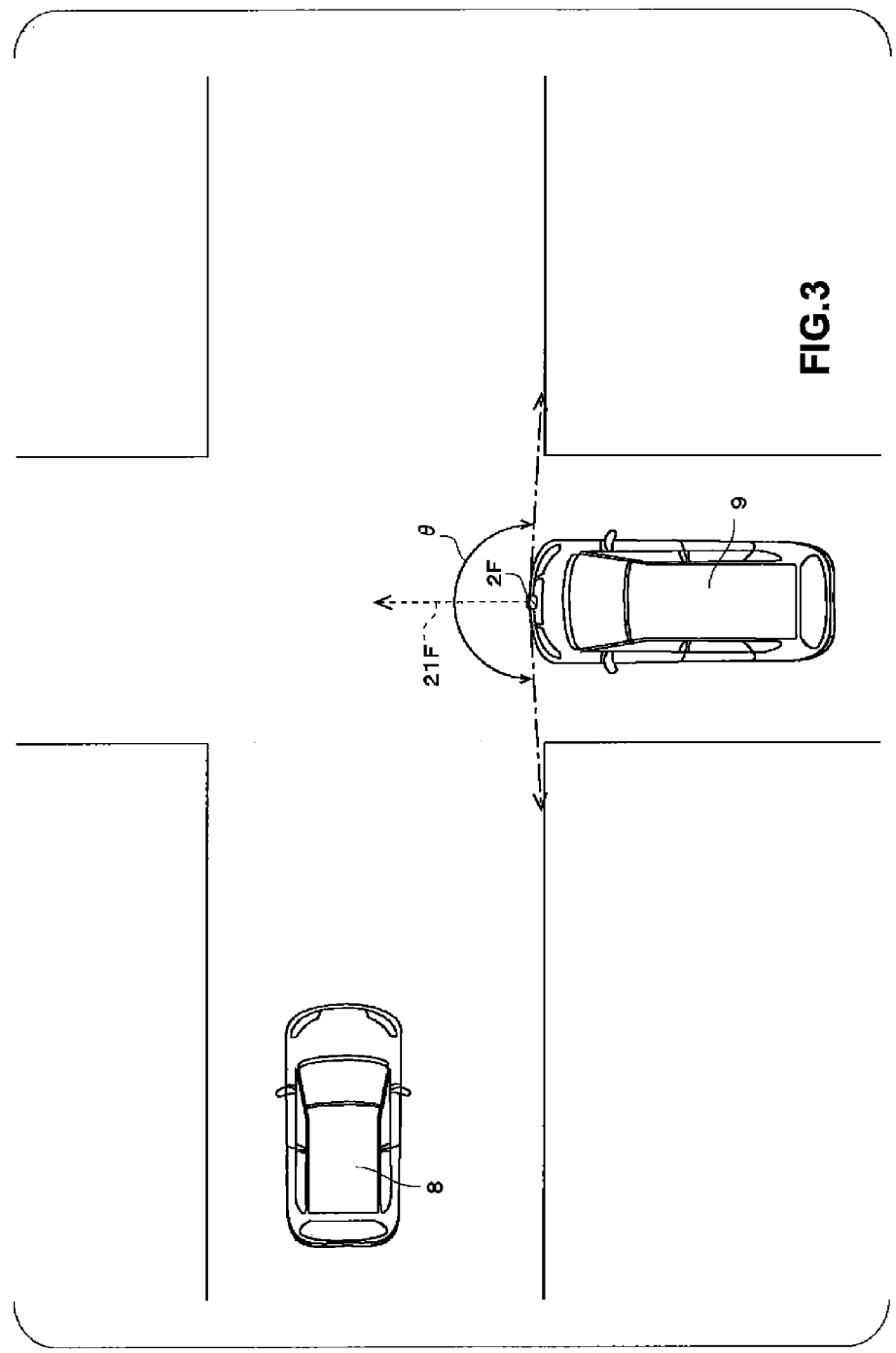
FIG. 3 shows one case where the object detection system is used.

FIG. 3 shows one case where the object detection system 10 is used. In FIG. 3, the own vehicle 9 has just approached the intersection with a poor view. As described above, the front camera 2F has the field angle θ of 180 degrees or more. As shown in FIG. 3, the front camera 2F is capable of photographing the area of the intersection at the state where only the front end of the own vehicle 9 is inside the intersection.

Thus, the object detection system 10 is capable of capturing the shot image including the images of another vehicle 8, a pedestrian or the like moving on the other road substantially perpendicular to the road on which the own vehicle 9 exists, and of displaying the shot image on the display 3. Then, the object detection system 10 is capable of detecting based on the shot image the object (another vehicle 8, the pedestrian or the like) approaching the own vehicle 9 from the left side or the right side of the own vehicle 9 on the other road, and of informing the user of the detected result. Therefore, the user can easily perceive the object approaching the own vehicle 9 before the entire body of the own vehicle 9 gets inside the intersection.

Here is a further description based on FIG. 1. The object detection system 10 includes an object detector 1 for detecting the object approaching the own vehicle 9 based on the shot image captured by one of the plurality of cameras 2. The object detector 1 includes an image acquisition part 12, an image processing circuit 13 and an image output part 14.

The image acquisition part 12 repeats acquiring shot images from one of the plurality of cameras 2 at predetermined intervals (for example, at intervals of 1/30 second), and then converts the captured shot images into digital shot images (A/D conversion). One shot image converted by the image acquisition part 12 is treated as one frame of video signals.

The image processing circuit 13 is a hardware circuit, such as ASIC or FPGA, that performs a prescribed processing to the shot image acquired by the image acquisition part 12. The image processing circuit 13 includes an object detection circuit 13a having a detection function for detecting an object. The object detection circuit 13a detects an object by a frame correlation method that uses a plurality of shot images (frames) acquired at successive times. The object detection circuit 13a outputs the result of the object detected through the object detection processing, if any.

The image output part 14 generates a display image including various types of information in addition to the shot image, and then converts the generated display image into a video signal of a prescribed format such as NTSC to output to the display 3. This allows for displaying the display image including the shot image on the display 3.

The object detector 1 further includes an operation switch 15, a signal receiver 16, a sound output part 17 and a controller 11.

The operation switch 15 is a switch disposed in the vehicle cabin of the own vehicle 9. The operation switch 15 receives a user operation, and then transmits to the controller 11 the signal indicating the contents of the user operation.

The signal receiver 16 receives signals from other devices via an in-vehicle network 91 installed in the own vehicle 9 to acquire the vehicle state of the own vehicle 9. The signal receiver 16 transmits to the controller 11 the signal indicating the received vehicle state. This allows the controller 11 to acquire the vehicle state of the own vehicle 9 (the velocity and the steering angle).

The signal receiver 16 receives the signals transmitted by a shift-position sensor 61, a velocity sensor 62 and a steering-angle sensor 63. The shift-position sensor 61 detects the shift position indicating the position of a shift lever in a gearbox installed on the own vehicle 9, and then transmits the signal indicating the shift position of the own vehicle 9. The velocity sensor 62 detects the velocity based on the rotation of a wheel axle of the own vehicle 9, and then outputs the signal indicating the velocity of the own vehicle 9. The steering-angle sensor 63 detects the steering angle that is the angle rotated from the neutral position of the steering wheel of the own vehicle 9, and then outputs the signal indicating the steering angle of the own vehicle 9. This allows the signal receiver 16 to acquire the shift position, the velocity and the steering angle as the vehicle state of the own vehicle 9.

The sound output part 17 generates a sound signal based on the signal transmitted by the controller 11 to output to the speaker 4. This allows the speaker 4 to generate a sound such as an alarm sound.

The controller 11 that is a microcomputer including, for example, a CPU, RAM and ROM controls each part of the object detector 1 including the image processing circuit 13. Various functions of the controller 11 are implemented by software. That is, CPU processing (implementation of programs) based on the programs stored in ROM or the like provides the functions of the controller 11. A state judgment part 11a, a condition changer 11b, a result notification part 11c and a mode changer 11d shown in the figure are a part of the functions provided by the implementation of the programs.

The state judgment part 11a judges whether enabling the detection function of the object detection circuit 13a is acceptable or not. Concretely, the state judgment part 11a judges whether the detection accuracy is ensured when the detection function of the object detection circuit 13a is enabled. The state judgment part 11a judges that, when the detection accuracy of the detection function is ensured, enabling the detection function is acceptable (shall be enabled), and when the detection accuracy of the detection function is not ensured, enabling the detection function is not acceptable (shall be disabled). The state judgment part 11a judges whether enabling the detection function of the object detection circuit 13a is acceptable or not based on the vehicle state (velocity and steering angle) of the own vehicle 9 acquired by the signal receiver 16.

The state judgment part 11a enables the detection function of the object detection circuit 13a when judging that enabling the detection function is acceptable, and disables the detection function of the object detection circuit 13a when judging that enabling the detection function is not acceptable. The state judgment part 11a changes the parameter relevant to the detection function for changing whether the detection function is to be enabled or disabled. This allows the state judgment part 11a to change whether the detection function of the object detection circuit 13a is to be enabled or disabled while keeping the object detection circuit 13a activated.

The condition changer 11b changes judgment conditions for use for judging whether enabling the detection function of the state judgment part 11a is acceptable or not. The judgment conditions include a steering angle range that is the condition relevant to the steering angle of the own vehicle 9. The condition changer 11b changes the steering angle range in accordance with the velocity of the own vehicle 9.

The result notification part 11c makes a control to inform the user of the detection result of the object detection processing carried out by the object detection circuit 13a. The result notification part 11c receives the detection result output by the object detection circuit 13a. Then, the result notification part 11c outputs a signal to the image output part 14 so as to make the image output part 14 generate the display image showing the detection result. This allows for displaying the display image showing the detection result on the display 3. The result notification part 11c also outputs a signal to the sound output part 17 so as to make the sound output part 17 generate the sound signal according to the detection result. This allows for generating the alarm sound according to the detection result from the speaker 4.

Figure 4:
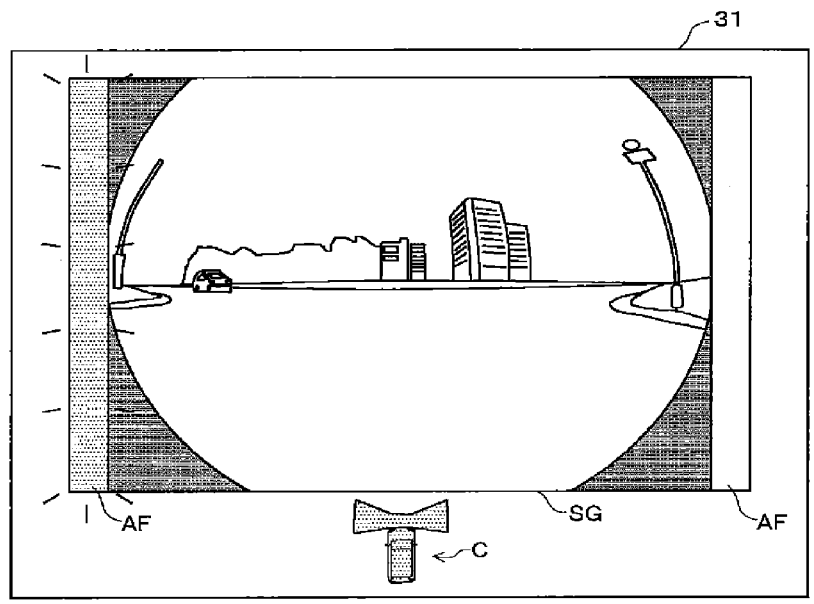
FIG. 4 shows a sample display image.

FIG. 4 shows a sample image of a display image 31 to be displayed on the display 3. The display image 31 includes a shot image SG captured by one of the plurality of cameras 2, and also two of warning parts AF each of which functions as an indicator for indicating the detection result of the object detection processing. The two of the warning parts AF each of which is formed into a vertically-long rectangular are disposed respectively at the right side and the left side of the shot image SG. When an object is approaching the own vehicle 9 from the left side, the left one of the warning parts AF flashes in a prescribed color (for example, yellow) as shown in FIG. 4. When an object is approaching the own vehicle 9 from the right side, the right one of the warning parts AF flashes in a prescribed color. As well, when an object is approaching the own vehicle 9, a prescribed alarm sound is output from the speaker 4. This allows the user to easily perceive the existence of the object approaching the own vehicle 9, and also the direction of the object existing.

The display image 31 further includes an icon C. The icon C functions as an indicator for indicating whether the detection function of the object detection circuit 13a is enabled or not. Here are the examples. When the detection function of the object detection circuit 13a is enabled, the icon C is displayed in a prescribed chromatic color (for example, green). When the detection function of the object detection circuit 13a is disabled, the icon C is displayed in an achromatic color (for example, grey). The user is informed of the detection result of the object detection processing only when the detection function of the object detection circuit 13a is enabled; while the user is not informed of the detection result when the detection function of the object detection circuit 13a is disabled.

Here is a further description based on FIG. 1. The mode changer 11d changes an operation mode on the object detection system 10. The object detection system 10 has three operation modes: a normal mode; a front mode; and a back mode. The mode changer 11d changes the operation mode according to the user operation made with the operation switch 15 or the shift-lever position.

Figure 5:
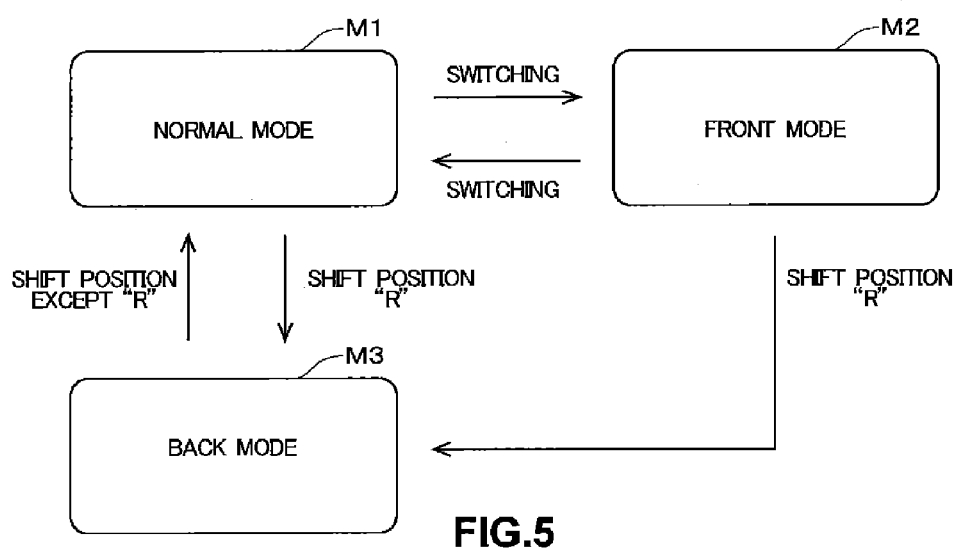
FIG. 5 shows operation-mode transition on the object detection system.

FIG. 5 shows such operation-mode transition on the object detection system 10. A normal mode M1 is the operation mode for displaying none of the shot images captured by the plurality of cameras 2 on the display 3. In the case of the display 3 having a navigation function or the like, an image based on the function in the display 3 (for example, a map image for route guidance) is displayed on the display 3, in the normal mode M1.

Each of a front mode M2 and a back mode M3 is the operation mode for displaying the shot image showing the periphery of the own vehicle 9 on the display 3. The front mode M2 is the operation mode for displaying the shot image captured by the front camera 2F. The back mode M3 is the operation mode for displaying the shot image captured by the rear camera 2B. In each of the front mode M2 and the back mode M3, when a prescribed condition is satisfied, the detection function of the object detection circuit 13a is enabled to carry out the object detection processing based on the shot image to be displayed. Then, the user is informed of the detection result of the object detection processing. The icon C (refer to FIG. 4) indicates whether the current operation mode is the front mode M2 or the back mode M3.

In the case where the operation mode is the normal mode M1, when the user makes an operation with the operation switch 15, the mode changer 11d changes the operation mode to the front mode M2. Thus, the user can check the forward area of the own vehicle 9 and perceive the object approaching the own vehicle 9 from the forward direction at user's desired timing by operating the operation switch 15. In the case where the operation mode is the front mode M2, when the user makes an operation with the operation switch 15, the mode changer 11*d* changes the operation mode to the normal mode M1.

In the case where the operation mode is the normal mode M1 or the front mode M2, when the user operates the shift lever to the position of "R (reverse)," the mode changer 11*d* changes the operation mode to the back mode M3. This allows the user to check the rear area of the own vehicle 9 and to perceive the object approaching the own vehicle 9 from the backward direction, when reversing the own vehicle 9. In the case where the operation mode is the back mode M3, when the user operates the shift lever to the position other than "R (reverse)," the mode changer 11*d* changes the operation mode to the normal mode M1.

<1-2. Outline of Object Detection Processing>

Next, the object detection processing carried out by the object detection circuit 13*a* is described. As described so far, the object detection circuit 13*a* detects an object by the frame correlation method that uses the plurality of shot images (frames) acquired at successive times. The object detection circuit 13*a* of the embodiment detects an object by an optical flow method that is one of the frame correlation methods.

Figure 6:
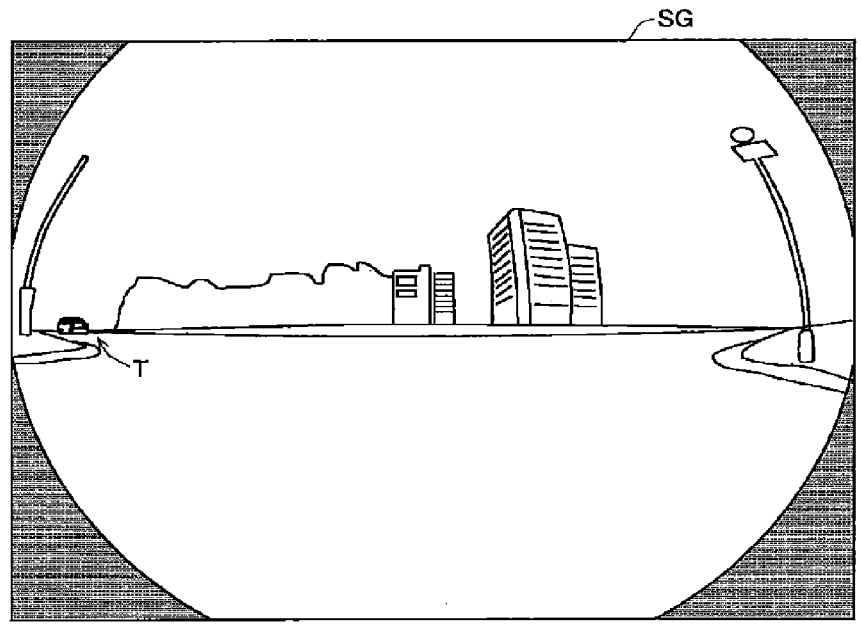
FIG. 6 shows a sample of the shot images captured by a front camera.
Figure 7:
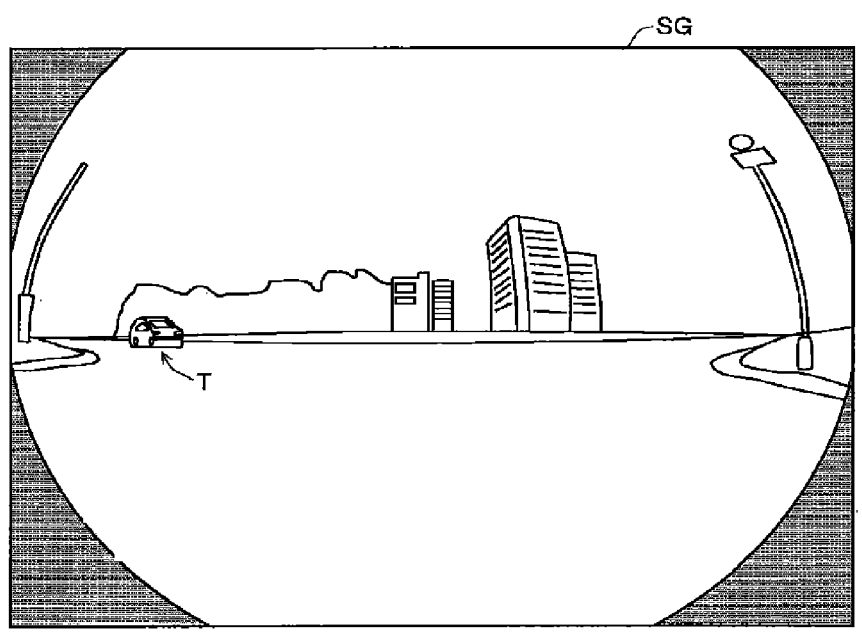
FIG. 7 shows another sample of the shot images captured by the front camera.
Figure 8:
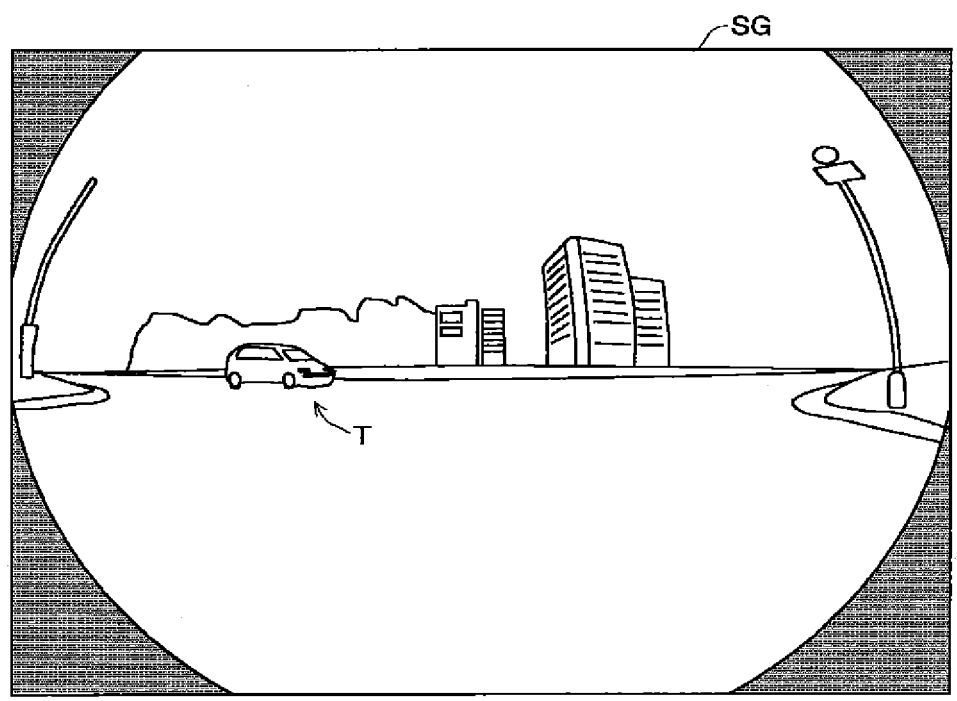
FIG. 8 shows another sample of the shot images captured by the front camera.

FIG. 6, FIG. 7 and FIG. 8 show sample images of a plurality of shot images SG captured by the front camera 2F time sequentially. The shot image SG in FIG. 6 is the oldest, and the shot image SG in FIG. 8 is the newest. Each of the shot images SG in FIG. 6, FIG. 7 and FIG. 8 includes an image T of the same object approaching the own vehicle 9. The object detection circuit 13*a* detects an object approaching the own vehicle 9 based on the plurality of such shot images SG captured time sequentially, by carrying out the object detection processing by the optical flow method.

Figure 9:
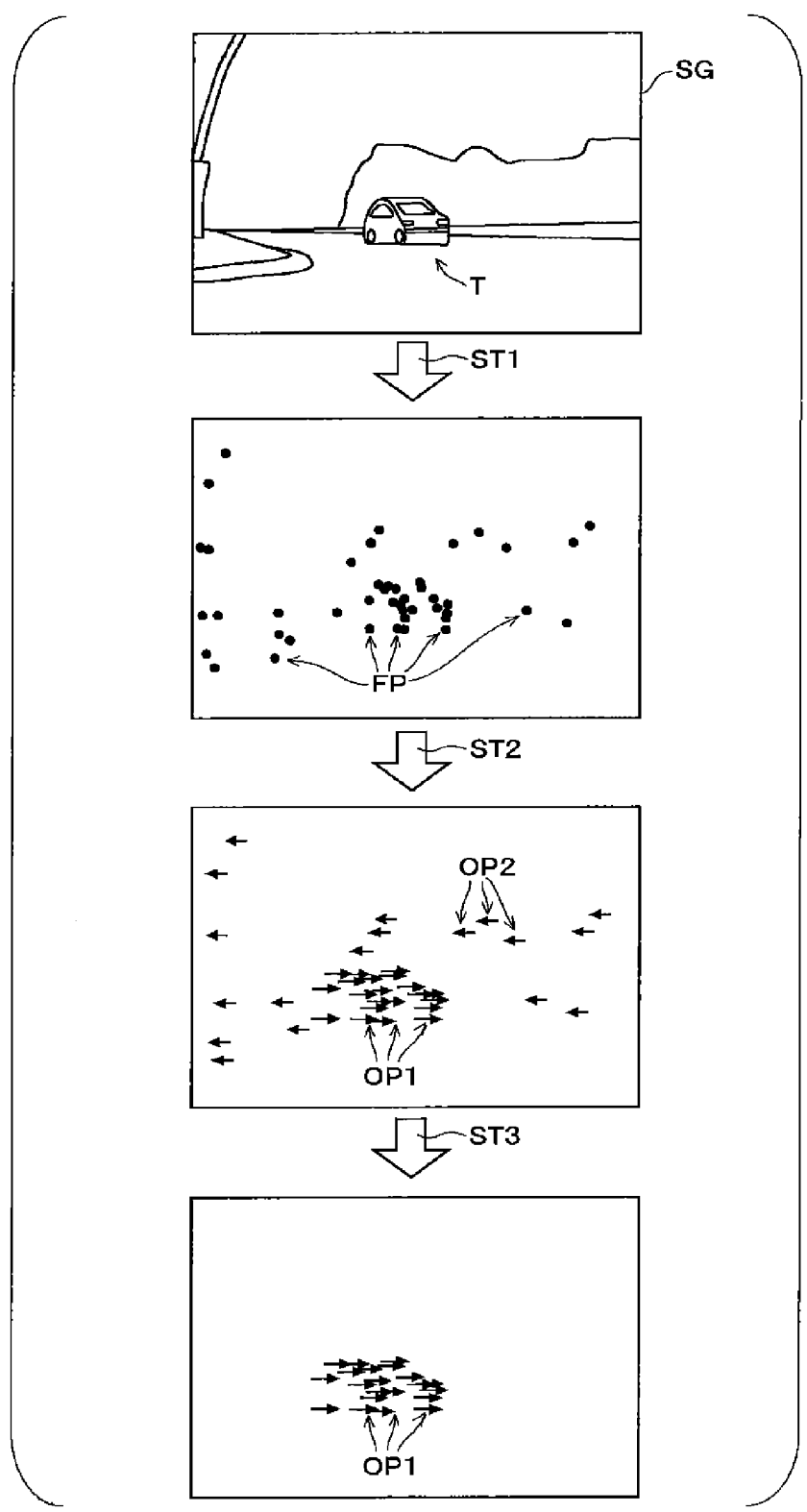
FIG. 9 is for description of the outline of an optical flow method.

FIG. 9 is for description of the outline of the optical flow method. FIG. 9 partially shows the shot image SG, including the image T of the object. The object detection circuit 13*a* extracts feature points FP from each of the plurality of shot images (frames) captured at different timings, and then detects an object based on the optical flows that show the move of the feature points FP among the plurality of shot images.

First, the object detection circuit 13*a* extracts the feature points FP (points remarkably detectable) on the shot image SG captured at the latest by a well-known method such as Harris operator method (step ST1). This allows the object detection circuit 13*a* to extract a plurality of points including the corners (intersection of edges) of the image T of the object, as the feature points FP.

Next, the object detection circuit 13*a* makes each of the feature points extracted from the latest shot image SG [hereinafter, referred to as latest feature point(s)] associated with each of the feature points extracted from the past shot image SG [hereinafter, referred to as past feature point(s)]. The past feature points are stored, for example, in the memory of the object detection circuit 13*a*. The object detection circuit 13*a* derives the optical flows that are vectors each of which shows the move of the feature point FP based on the positions of the latest feature point and the associated past feature point (step ST2).

For making association between the latest feature point and the past feature point, the object detection circuit 13*a* selects the past feature point to be associated with the latest feature point among the past feature points existing in the range of, for example, "7 pixels" from the position of the latest feature point. Accordingly, the possible minimum value of the length of the optical flow derived by the object detection circuit 13*a* is "1 pixel," and the possible maximum value is "7 pixels." In general, the optical flow of the object moving by itself is relatively long; while the optical flow of the object not moving by itself such as a background is relatively short. The optical flows include an optical flow OP1 that points to the right and an optical flow OP2 that points to the left. In general, the image T of the object approaching the own vehicle 9 moves inward (moving toward a center from the left or right end of the shot image SG).

Therefore, the object detection circuit 13*a* extracts only the optical flows pointing inward and having the lengths exceeding a prescribed threshold for extraction (step ST3). The threshold for extraction that is one of the parameters, relevant to the detection function of the object detection circuit 13*a*, and its normal value is, for example, "1 pixel." This allows the object detection circuit 13*a* to extract only the optical flows with the lengths from 2 pixels to 7 pixels, and to exclude the optical flows corresponding to the backgrounds or the like. The object detection circuit 13*a* further extracts, in the left area divided at the horizontal center of the shot image SG, only the plural optical flows OP1 that point to the right, and in the right area divided at the horizontal center of the shot image SG; only the plural optical flows OP2 that point to the left. This allows the object detection circuit 13*a* to exclude the optical flows of the object moving away from the own vehicle 9. Since FIG. 9 shows the left area of the shot image SG divided at the horizontal center, only the optical flows OP1 that point to the right are extracted in FIG. 9.

The object detection circuit 13*a* performs grouping adjacent flows out of the extracted optical flows OP1, and detects each of such grouped flows as an object. When detecting an object by such a method, the object detection circuit 13*a* outputs the location of the object as a detection result.

The frame correlation methods such as the optical flow method have the characteristics that they require relatively little arithmetic amount for detection of an object because of no need of image scanning. The frame correlation methods such as the optical flow method also have the characteristics that the detection accuracy is subject to the velocity and the steering angle of the own vehicle 9 and it becomes more difficult for the own vehicle 9 with a larger velocity or a larger steering angle to detect an object accurately. That is, the larger the velocity of the own vehicle 9 becomes, or the larger the steering angle of the own vehicle 9 becomes, the worse the detection accuracy by the frame correlation method becomes (the detection accuracy by the object detection circuit 13*a*).

Figure 10:
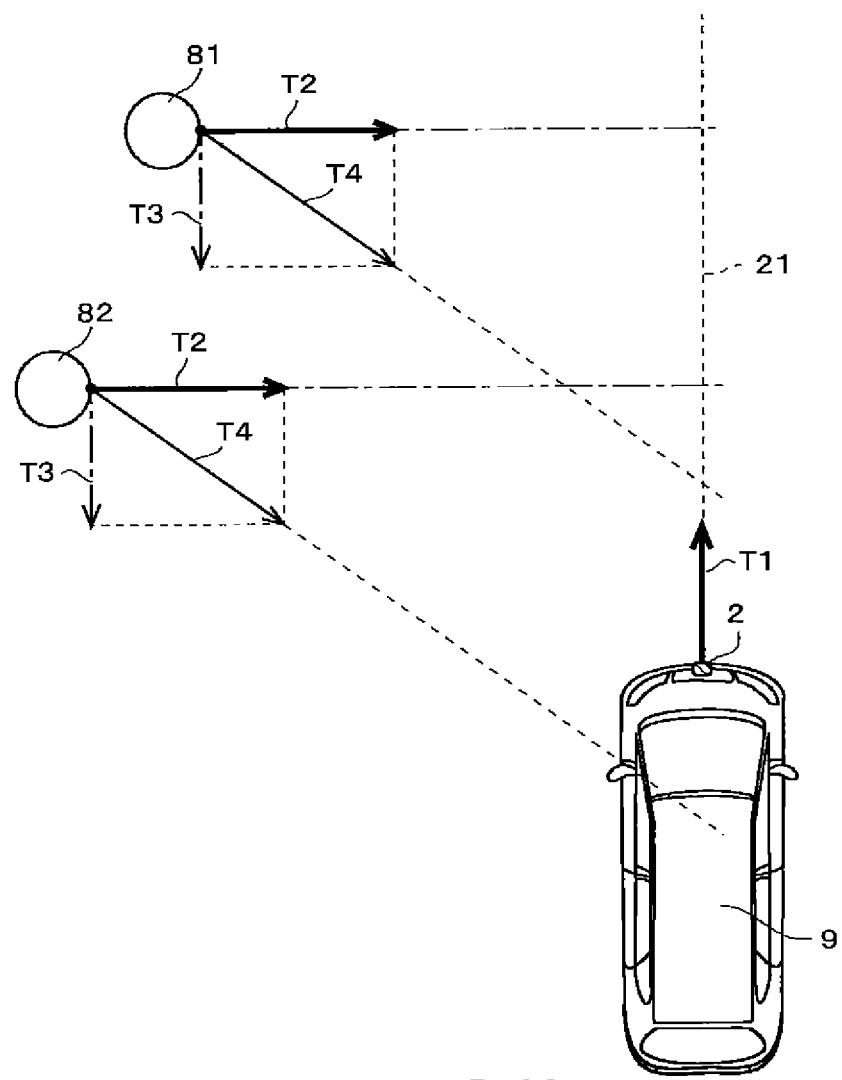
FIG. 10 is for description of detection accuracy when a vehicle is going straight.

FIG. 10 is for description of the detection accuracy by the object detection circuit 13*a* when the own vehicle 9 is going straight. FIG. 10 shows the own vehicle 9, and an object 81 and an object 82 that move by themselves in the periphery of the own vehicle 9. The two of the object 81 and the object 82 approaching the own vehicle 9 are moving toward the right in the figure at the same velocity. As described above, the object detection circuit 13*a* extracts only the optical flows pointing inward for detection of the objects approaching the own vehicle 9. The optical flows of an object point inward when a relative velocity vector of the object to the own vehicle 9 intersects with an optical axis 21 of the camera 2.

First, a case that the own vehicle 9 stops is assumed. In this case, each of the relative velocity vectors of the object 81 and the object 82 to the own vehicle 9 corresponds to a velocity vector T2 of the object 81 or the object 82 itself. Since the two of the vehicle vectors T2 intersect with the optical axis 21 of the camera 2, the optical flows of the object 81 and the object 82 point inward. Thus, the object detection circuit 13a can detect the both of the object 81 and the object 82.

Next, a case that the own vehicle 9 is going straight at a certain velocity is assumed. In this case, the velocity vector of the own vehicle 9 is a velocity vector T1 along the optical axis 21. Each of the relative velocity vectors of the object 81 and the object 82 to the own vehicle 9 corresponds to a composite vector T4 that is synthesized with each of the velocity vectors T2 of the object 81 and the object 82, and an inverse vector T3 that is opposite to the velocity vector T1 of the own vehicle 9. Since the composite vector T4 of the object 81 shown upper in the figure intersects with the optical axis 21 of the camera 2, the object detection circuit 13a can detect the object 81. However, since the composite vector T4 of the object 82 shown lower in the figure does not intersect with the optical axis 21 of the camera 2, the object detection circuit 13a can not detect the object 82.

As above, in some case of the own vehicle 9 when moving, the object detection circuit 13a may not detect the object to be detected essentially. The larger the velocity of the own vehicle 9 becomes, the lower the composite vector T4 points in the figure. In such a case, it is more difficult for the object detection circuit 13a to detect an object accurately. That is, in principle, the larger the velocity of the own vehicle 9 becomes, the worse the detection accuracy by the object detection circuit 13a becomes.

Figure 11:
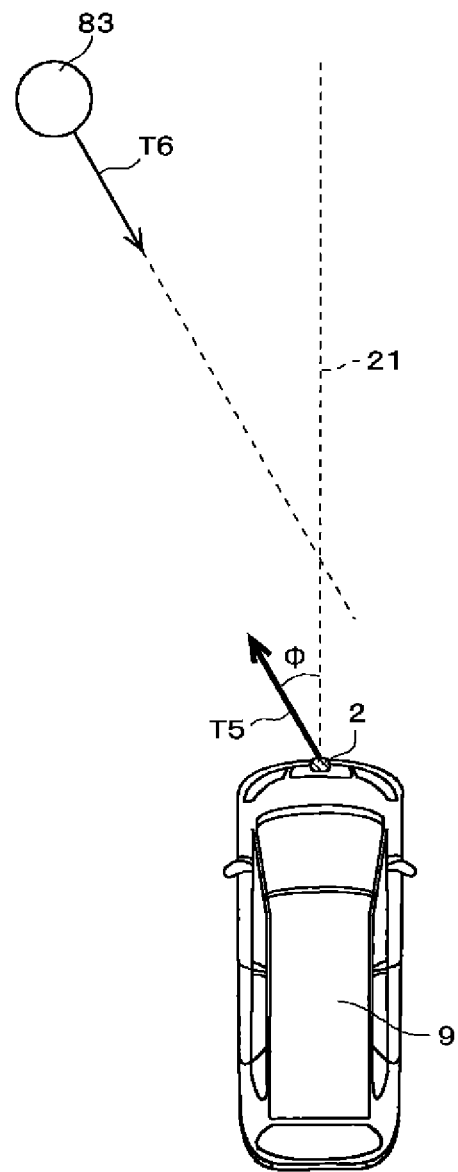
FIG. 11 is for description of detection accuracy when a vehicle is turning.

FIG. 11 is for description of the detection accuracy by the object detection circuit 13a when the own vehicle 9 is turning. FIG. 11 shows the own vehicle 9 and an object 83 that exists in the periphery of the own vehicle 9 but does not move by itself.

First, a case that the own vehicle 9 stops is assumed. In this case, the relative velocity vector of the object 83 to the own vehicle 9 does not exist. Thus, the object detection circuit 13a does not detect the object 83.

Next, a case that the own vehicle 9 is turning at a certain steering angle is assumed. In this case, the velocity vector of the own vehicle 9 is a velocity vector T5 that is arranged at an angle Φ to the optical axis 21. The relative velocity vector of the object 83 to the own vehicle 9 corresponds to an inverse vector T6 that is opposite to the velocity vector T5 of the own vehicle 9. Since the velocity vector T6 intersects with the optical axis 21 of the camera 2, the object detection circuit 13a erroneously detects the object 83 as the object approaching the own vehicle 9.

As described above, in some case of the own vehicle 9 when turning, the object detection circuit 13a may erroneously detect the object not to be detected essentially. The larger the steering angle of the own vehicle 9 becomes, the upper the velocity vector T6 points in the figure. In such a case, it is more difficult for the object detection circuit 13a to detect an object accurately. That is, in principle, the larger the steering angle of the own vehicle 9 becomes, the worse the detection accuracy by the object detection circuit 13a becomes.

In order to ensure the detection accuracy by the object detection circuit 13; the state judgment part 11a enables the detection function of the object detection circuit 13a only when the velocity or the steering angle of the own vehicle 9 satisfy the prescribed judgment conditions.

Figure 12:
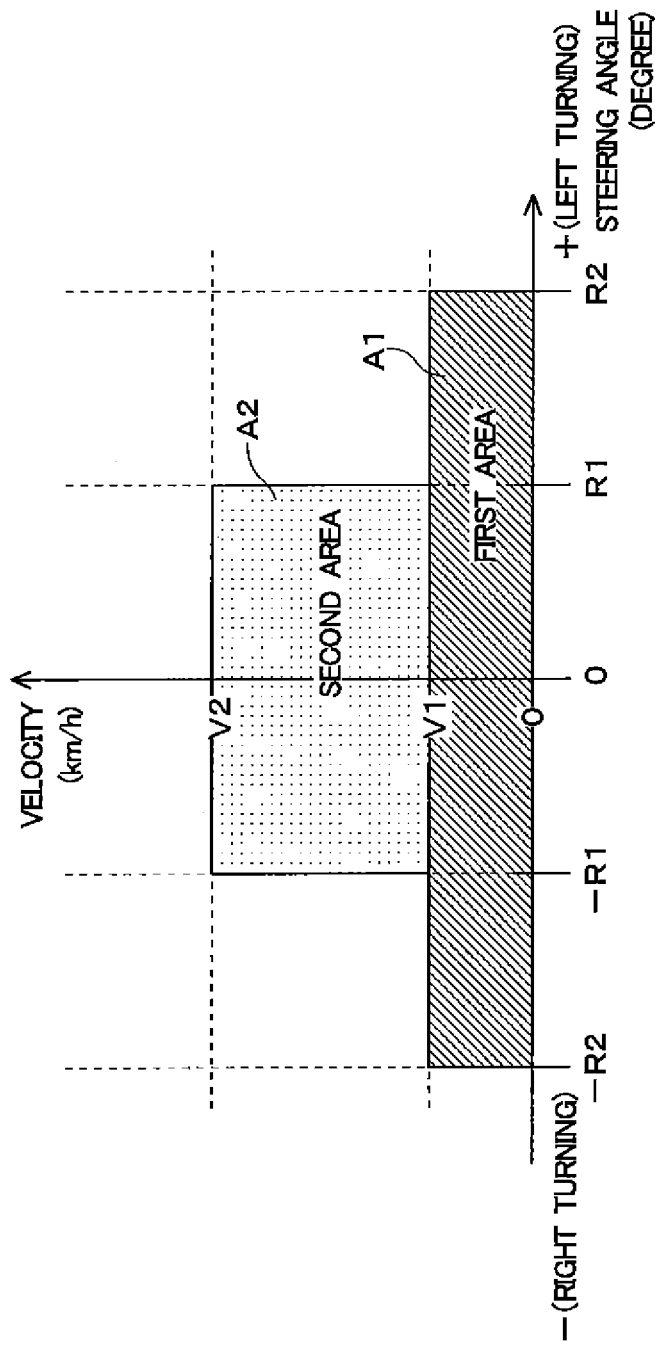
FIG. 12 shows one example of the judgment conditions for judging whether enabling a detection function is acceptable or not.

FIG. 12 shows the judgment conditions that the state judgment part 11a uses for judging whether enabling the detection function is acceptable or not. In the figure, the horizontal axis shows a steering angle (degree) and the vertical axis shows a velocity (km/h). The steering angle is represented with a positive value when a driver turns a steering wheel to the left from a neutral position, and represented with a negative value when the driver turns it to the right.

Here are the cases where the velocities and the steering angles of the own vehicle 9 are plotted on the graph of FIG. 12. When the plotted point is included in either a first area A1 or a second area A2 in the graph, the state judgment part 11a judges that enabling the detection function is acceptable (shall be enabled). On the other hand, when the plotted point is included neither in the first area A1 nor in the second area A2, the state judgment part 11a judges that enabling the detection function is not acceptable (shall be disabled).

The first area A1 is the area where the velocity is 0 or above but less than V1 and the absolute value of the steering angle is less than R2. The second area A2 is the area where the velocity is V1 or above but less than V2 and the absolute value of the steering angle is less than R1 (R1<R2). For example, V1 is 0.1 km/h, V2 is 3.0 km/h, R1 is 270 degrees, and R2 is 540 degrees.

The smaller the velocity of the own vehicle 9 is, the less the detection accuracy by the object detection circuit 13a depends on the steering angle of the own vehicle 9. Thus, when the velocity of the own vehicle 9 is substantially small, the detection accuracy by the object detection circuit 13a is ensured even if the steering angle of the own vehicle 9 is larger to some extent. Therefore, regarding the steering angle range (lateral range in FIG. 12) for use as the conditions of the steering angle, the first area A1 for the case where the velocity is relatively small is wider than the second area A2 for the case where the velocity is relatively large.

The case where the velocity of the own vehicle 9 is 0 or above but less than V1 corresponds to the own vehicle 9 being in a stoppage state. In such a stoppage state of the own vehicle 9, the detection accuracy by the object detection circuit 13a is not dependent on the steering angle of the own vehicle 9. Thus, the maximum value of the steering angle may be set as the value R2 that specifies the steering angle range for the condition of the steering angle in such a stoppage state of the own vehicle 9.

The condition changer 11b sets either the first area A1 or the second area A2 as the judgment condition for judging whether enabling the detection function is acceptable. The condition changer 11b sets the first area A1 as the judgment condition when the velocity of the own vehicle 9 is 0 or above but less than V1, and sets the second area A2 when the velocity of the own vehicle 9 is V1 or above but less than V2. Further, the condition changer 11b sets as the judgment condition neither the first area A1 nor the second area A2 when the velocity of the own vehicle 9 is V2 or above.

Therefore, the smaller the velocity of the own vehicle 9 is, the wider the steering angle range set by the condition changer 11b as the condition of the steering angle becomes. As above, the case where the velocity of the own vehicle 9 is 0 or above but less than V1 corresponds to the own vehicle 9 being in the stoppage state. That is, the condition changer 11b substantially judges whether the own vehicle 9 is in the running state or in the stoppage state based on the velocity of the own vehicle 9. When the own vehicle 9 is in the stoppage state, the condition changer 11b sets as the condition of the steering angle the wider steering angle range than that in the running state.

As above, the condition changer 11*b* changes the steering angle range as the condition of the steering angle in accordance with the velocity of the own vehicle 9. This allows for relaxing the condition for enabling the detection function in accordance with the velocity of the own vehicle 9 within the range where the detection accuracy is ensured. That is, the object detection system 10 is able to detect an object in a relatively wide steering angle, while ensuring the detection accuracy.

<1-3. Change of Detection Function to be Enabled or Disabled>

Next description is about the method where the state judgment part 11*a* changes whether the detection function of the object detection circuit 13*a* is to be enabled or disabled. The state judgment part 11*a* enables the detection function of the object detection circuit 13*a* when judging that enabling the detection function is acceptable, and disables the detection function of the object detection circuit 13*a* when judging that enabling the detection function is not acceptable.

The state judgment part 11*a* changes the extraction threshold corresponding to a parameter so as to change whether the detection function of the object detection circuit 13*a* is to be enabled or disabled. This keeps the object detection circuit 13*a* activated without stoppage even when the detection function of the object detection circuit 13*a* is disabled. The detection function of the object detection circuit 13*a* is substantially disabled by the method where the object detection circuit 13*a* does not output any detection result while carrying out the object detection processing.

As described above, the object detection circuit 13*a* detects an object by extracting only the optical flows that have the lengths exceeding the extraction threshold during the object detection processing. The possible maximum value of the lengths of the optical flows derived by the object detection circuit 13*a* is "7 pixels."

When disabling the detection function of the object detection circuit 13*a*, the state judgment part 11*a* changes the extraction threshold from a normal value "1 pixel" to "7 pixels" that is the possible maximum value of the lengths of the optical flows. There is no optical flow having the length exceeding "7 pixels." Therefore, changing the extraction threshold to "7 pixels" allows the object detection circuit 13*a* not to detect any object even if carrying out the object detection processing, and thus the object detection circuit 13*a* becomes the state of not outputting any detection result. As a result, this disables the detection function while keeping the object detection circuit 13*a* activated. When the detection function of the object detection circuit 13*a* is disabled, it is most desirable that the maximum value should be set as the extraction threshold. However, the value larger than the normal value may be set instead of the maximum value.

When enabling the detection function of the object detection circuit 13*a*, the state judgment part 11*a* changes the extraction threshold from "7 pixels" to the normal value "1 pixel." This allows the object detection circuit 13*a* to extract the optical flows that have the lengths exceeding "1 pixel," and thus the object detection circuit 13*a* becomes ready for outputting the detection result of the detected object, if any. Even when the detection function is disabled, the object detection circuit 13*a* is kept activated without stoppage. That is, in order to enable the detection function of the object detection circuit 13*a*, there is no need to restart the object detection circuit 13*a*, requiring a certain period of time (approximately one second). Therefore, the detection result by the object detection circuit 13*a* is promptly obtained after the detection function is enabled.

There may be another measure; when the state judgment part 11*a* judges that enabling the detection function is not acceptable, the result notification part 11*c* does not inform a user of the detection result by the object detection circuit 13*a* without disabling of the detection function of the object detection circuit 13*a*. However, if such a measure is adopted, a processing load on the controller 11 increases because an additional step in the processing on the controller 11 is necessary every time the object detection circuit 13*a* outputs the detection result. Thus, it is desirable that the detection function of the object detection circuit 13*a* should be disabled as described above so that the object detection circuit 13*a* does not output the detection result.

<1-4. Processing Flow>

Figure 13:
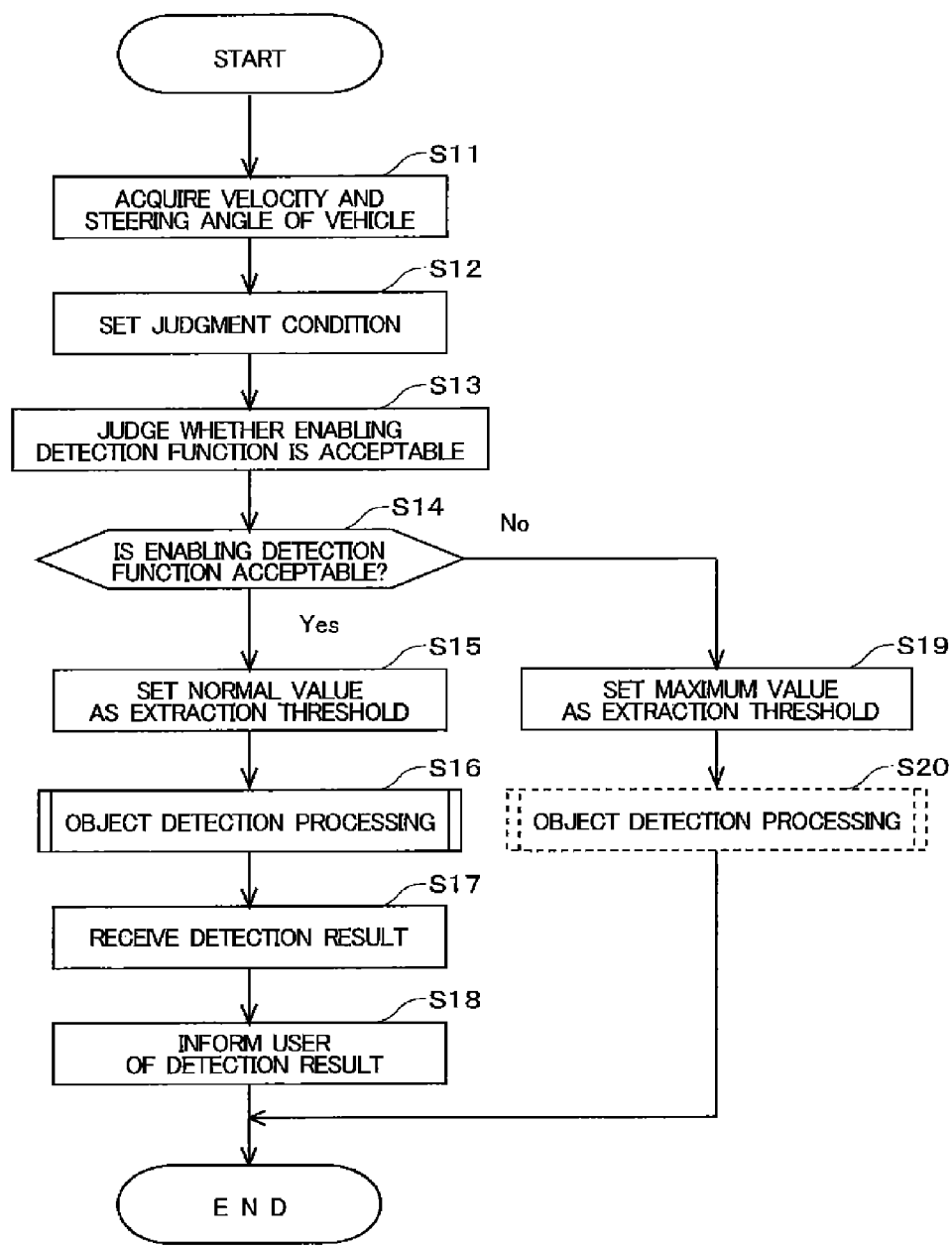
FIG. 13 shows a processing flow on the object detection system.

FIG. 13 shows the processing flow on the object detection system 10. When the operation mode of the object detection system 10 is the front mode M2 or the back mode M3, the processing shown in FIG. 13 is repeated at a predetermined interval (for example, at interval of 1/30 second). Following description is about the processing flow on the object detection system 10 when the operation mode is the front mode M2 or the back mode M3.

First, the signal receiver 16 acquires the vehicle state of the own vehicle 9 (step S11). The signal receiver 16 receives the signals transmitted by the velocity sensor 62 and the steering-angle sensor 63 to acquire the velocity and the steering angle of the own vehicle 9. This allows the controller 11 to acquire the vehicle state of the own vehicle 9 (the velocity and the steering angle).

Next, the condition changer 11*b* sets the judgment condition for judging whether enabling the detection function is acceptable or not (step S12). As described above, the condition changer 11*b* sets the first area A1 as the judgment condition when the velocity of the own vehicle 9 is 0 or above but less than V1, and sets the second area A2 as the judgment condition when the velocity of the own vehicle 9 is V1 or above but less than V2. The condition changer 11*b* sets as the judgment condition neither the first area A1 nor the second area A2 when the velocity of the own vehicle 9 is V2 or above. As above, the condition changer 11*b* changes the steering angle range corresponding to the condition of the steering angle in accordance with the velocity of the own vehicle 9.

Next, the state judgment part 11*a* judges whether enabling the detection function of the object detection circuit 13*a* is acceptable or not based on the judgment condition set by the condition changer 11*b* (step S13). When the vehicle state of the own vehicle 9 acquired by the signal receiver 16 satisfies the judgment condition, the state judgment part 11*a* judges that enabling the detection function is acceptable. On the other hand, when the vehicle state of the own vehicle 9 does not satisfy the judgment condition, the state judgment part 11*a* judges that enabling the detection function is not acceptable.

When judging that enabling the detection function is acceptable (Yes at the step S14), the state judgment part 11*a* sets the normal value "1 pixel" as the extraction threshold corresponding to one parameter relevant to the detection function of the object detection circuit 13*a* by transmitting a signal to the object detection circuit 13*a* (step S15).

This enables the detection function of the object detection circuit 13*a*. The object detection circuit 13*a* carries out the object detection processing in the state where the detection function is enabled (step S16). Thus, the object detection circuit 13*a* outputs to the controller 11 the result of a detected object, if any.

When the object detection circuit 13*a* outputs the detection result, the result notification part 11*c* of the controller 11 receives the detection result (step S17). Then, the result notification part 11*c* makes the display 3 display the display image showing the detection result, and as well makes the speaker 4 output the alarm sound in accordance with the detection result. This informs the user of the detection result (step S18).

On the other hand, when judging that enabling the detection function is not acceptable (No at the step S14), the state judgment part 11*a* sets as the extraction threshold the possible maximum value of the lengths of the optical flows, "7 pixels," by transmitting a signal to the object detection circuit 13*a* (step S19).

This disables the detection function of the object detection circuit 13*a*. However, the object detection circuit 13*a* is kept activated, and the object detection circuit 13*a* carries out the object detection processing in the state where the detection function of the object detection circuit 13*a* is disabled (step S20). In this case, the object detection circuit 13*a* neither detects any object, nor outputs any detection result.

In the processing shown in FIG. 13, the state judgment part 11*a* always sets the extraction threshold in either the step S15 or the step S19. However, the state judgment part 11*a* may set the extraction threshold only when changing whether the detection function of the object detection circuit 13*a* is to be enabled or disabled.

As above, on the object detection system 10 of the embodiment, the object detection circuit 13*a* detects an object by the frame correlation method that uses the plurality of shot images captured at successive times. The state judgment part 11*a* changes the parameter relevant to the detection function so as to change whether the detection function of the object detection circuit 13*a* is to be enabled or disabled while keeping the object detection circuit 13*a* activated. This keeps the object detection circuit 13*a* activated without stoppage even when the detection function of the object detection circuit 13*a* is disabled. Therefore, since there is no need to restart the object detection circuit 13*a* in order to enable the detection function, the detection result by the object detection circuit 13*a* is promptly obtained.

The state judgment part 11*a* changes the extraction threshold corresponding to one parameter relevant to the detection function to the possible maximum value of the lengths of the optical flows in order to disable the detection function of the object detection circuit 13*a*. Thus, the state judgment part 11*a*, only by changing the extraction threshold, easily disables the detection function of the object detection circuit 13*a* while keeping the object detection circuit 13*a* activated.

The state judgment part 11*a* disables the detection function of the object detection circuit 13*a* when the steering angle of the own vehicle 9 is not in the prescribed steering angle range. Then, the condition changer 11*b* changes the steering angle range corresponding to the condition of the steering angle in accordance with the velocity of the own vehicle 9. Therefore, the condition for enabling the detection function may be relaxed in accordance with the velocity of the own vehicle 9 within the range where the detection accuracy is ensured. That is, an object is detectable in a relatively wide steering angle, while the detection accuracy is ensured.

2. Second Embodiment

Next, the second embodiment is described. The configuration and the processing on an object detection system 10 of the second embodiment are substantially the same as the ones of the first embodiment. Thus, the points different from the first embodiment are primarily described. On the first embodiment, the state judgment part 11*a* judges whether enabling the detection function of the object detection circuit 13*a* is acceptable or not, based on the velocity and the steering angle of the own vehicle 9. In the second embodiment, a state judgment part 11*a* judges whether enabling the detection function of an object detection circuit 13*a* is acceptable or not, in further consideration of the operation state of the anti-lock braking system of an own vehicle 9.

Figure 14:
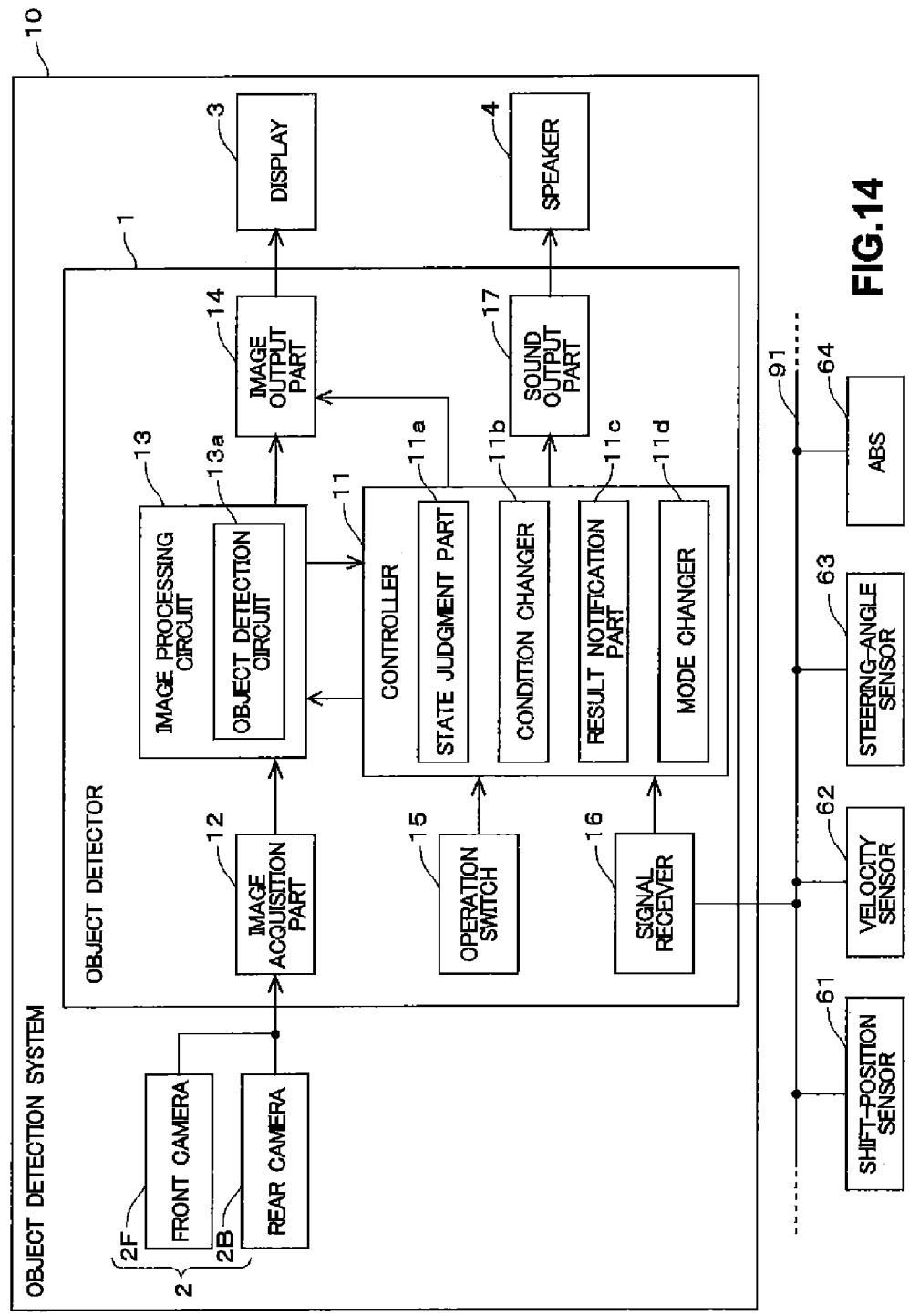
FIG. 14 shows a configuration of an object detection system of the second embodiment.

FIG. 14 shows a configuration of an object detection system 10 of the second embodiment. As shown in the figure, a signal receiver 16 of the second embodiment can receive a signal via an in-vehicle network 91 from an anti-lock braking system (hereinafter, referred to as "ABS") 64 installed in the own vehicle 9. Other parts of the configuration are the same as the ones of the first embodiment shown in FIG. 1.

The ABS 64 prevents wheel lock when there is the possibility of skidding of the own vehicle 9 with the wheels locked. The signal receiver 16 receives the signal from the ABS 64 to acquire as the vehicle state of the own vehicle 9 the operation state regarding on whether the ABS 64 is working or not.

Since there is the possibility of wheel lock in the case where the ABS 64 is working, the accuracy of the velocity (velocity detected based on the rotation of a wheel axle) detected by a velocity sensor 62 is lowered. In an example, the velocity detected by the velocity sensor 62 may be 0 (km/h) even when own vehicle 9 is actually in a running state.

Therefore, in the case where the ABS 64 is working, the object detection circuit 13*a* may not accurately detect an object approaching the own vehicle 9 even with the detection function of the object detection circuit 13*a* enabled. When a user is informed of such a detection result detected by the object detection circuit 13*a*, the user may incorrectly perceive that no object exists even if an object approaching the own vehicle 9 actually exists.

Therefore, the state judgment part 11*a* of the second embodiment judges, at the step S13 in FIG. 13, whether the ABS 64 is working or not based on the signal received by the signal receiver 16. When the ABS 64 is working, the state judgment part 11*a* judges that enabling the detection function of the object detection circuit 13*a* is not acceptable, and disables the detection function. When the ABS 64 is not working, the state judgment part 11*a* judges whether enabling the detection function of the object detection circuit 13*a* is acceptable or not based on the velocity and the steering angle of the own vehicle 9, in the same manner as the first embodiment.

As above, on the object detection system 10 of the second embodiment, the state judgment part 11*a* disables the detection function of the object detection circuit 13*a* in the case where the ABS 64 is working. This allows for ensuring the detection accuracy of the object detection circuit 13*a*.

3. Third Embodiment

Next, the third embodiment is described. The configuration and the processing on an object detection system 10 of the third embodiment are substantially the same as the ones of the first embodiment. Thus, the points different from the first embodiment are primarily described. On the first embodiment, the state judgment part 11*a* judges whether enabling the detection function of the object detection circuit 13a is acceptable or not based on the velocity and the steering angle of the own vehicle 9. On the third embodiment, a state judgment part 11a judges whether enabling the detection function of an object detection circuit 13a is acceptable or not, in further consideration of the open-close state of a rear door 92 in a back mode M3.

Figure 15:
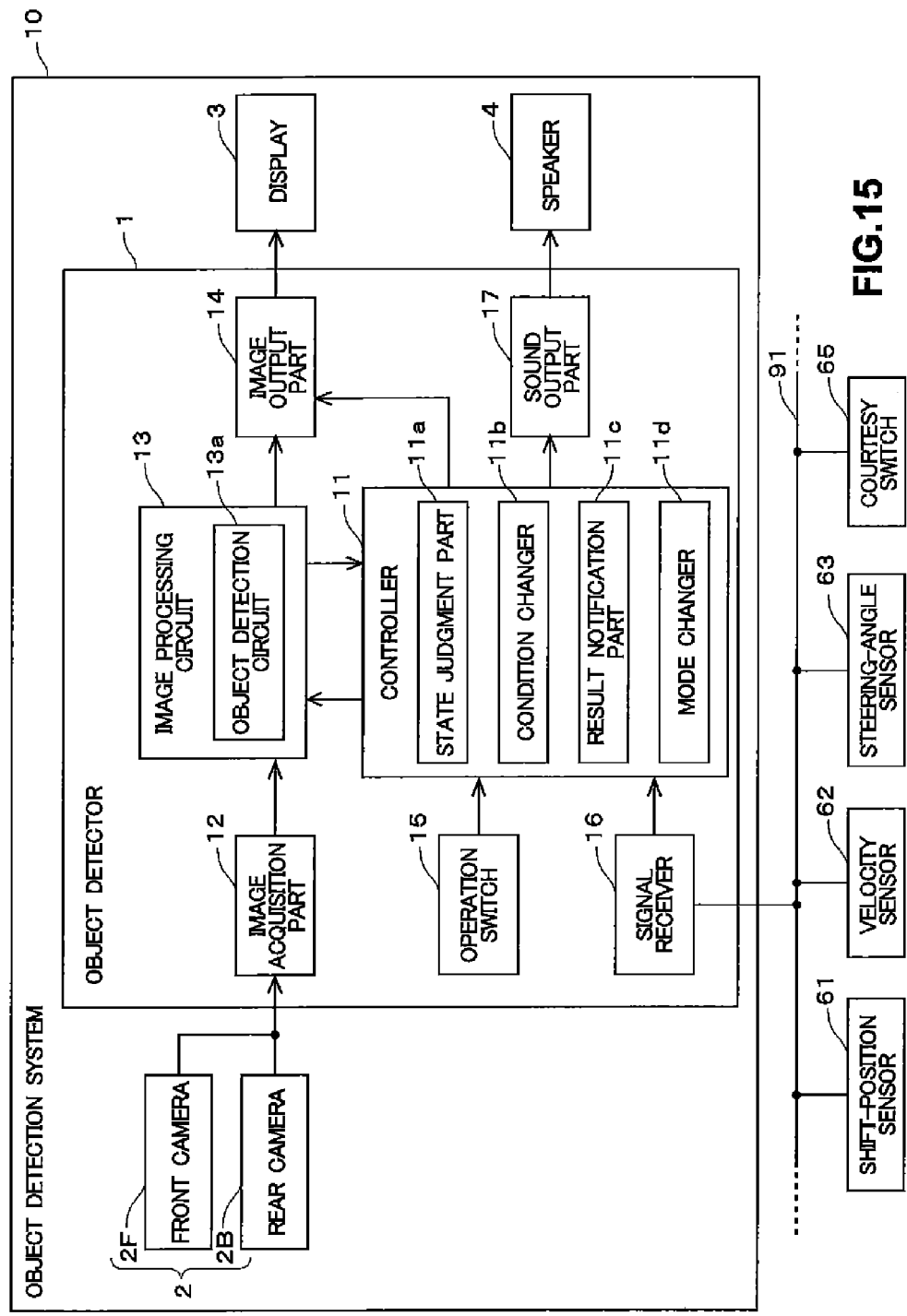
FIG. 15 shows a configuration of an object detection system of the third embodiment.

FIG. 15 shows the configuration of the object detection system 10 of the third embodiment. As shown in the figure, a signal receiver 16 of the third embodiment can receive a signal via an in-vehicle network 91 from a courtesy switch 65 disposed on the rear door 92. Other parts of the configuration are the same as the ones of the first embodiment shown in FIG. 1.

The courtesy switch 65 is a device that detects the open-close state regarding on whether the rear door 92 is opened or not. The signal receiver 16 receives the signal from the courtesy switch 65 to acquire the open-close state of the rear door 92 as the vehicle state of an own vehicle 9.

Figure 16:
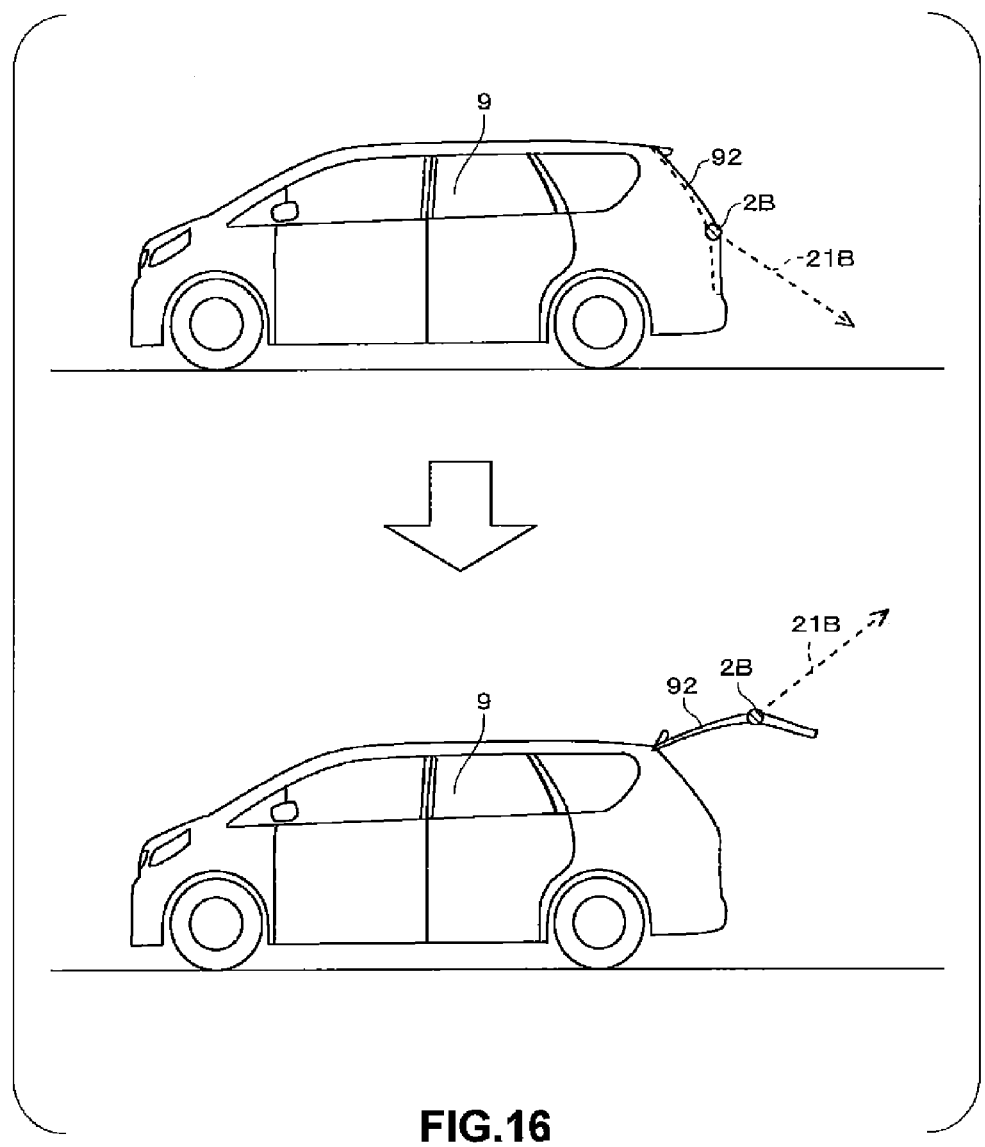
FIG. 16 shows the relation between the open-close state of a rear door and the optical axis of a rear camera.

As shown in FIG. 16, the rear door 92 of the own vehicle 9 may be a hatchback door. A user lifts up the rear door 92 to open when needed. As described above, a rear camera 2B is disposed on the rear door 92 of the rear end of the own vehicle 9. When the rear door 92 is closed as shown in the upper figure of FIG. 16, the rear camera 2B can appropriately photograph the backward area of the own vehicle 9 because an optical axis 21B of the rear camera 2B points a road surface. However, when the rear door 92 is opened as shown in the lower figure of FIG. 16, the rear camera 2B can not appropriately photograph the backward area of the own vehicle 9 because the optical axis 21B of the rear camera 2B does not point the road surface.

Therefore, when the rear door 92 is opened, the object detection circuit 13a even with its detection function enabled may not appropriately detect an object approaching the own vehicle 9. When a user is informed of such a detection result detected by the object detection circuit 13a, the user may incorrectly perceive that no object exists even if an object approaching the own vehicle 9 actually exists.

Therefore, in a back mode M3, the state judgment part 11a of the embodiment judges whether the rear door 92 is opened or not based on the signal received by the signal receiver 16 at the step S13 in FIG. 13. When the rear door 92 is opened, the state judgment part 11a judges that enabling the detection function of the object detection circuit 13a is not acceptable, and disables the detection function. When the rear door 92 is closed, the state judgment part 11a judges whether enabling the detection function of the object detection circuit 13a is acceptable or not based on the velocity and the steering angle of the own vehicle 9, in the same manner as the first embodiment.

As above, on the object detection system 10 of the third embodiment, the state judgment part 11a disables the detection function of the object detection circuit 13a when the rear door 92 is opened. This allows for ensuring the detection accuracy of the object detection circuit 13a.

On the embodiment, the state judgment part 11a may also judge whether enabling the detection function of the object detection circuit 13a is acceptable or not in further consideration of the operation state of the ABS 64 of the own vehicle 9, in the same manner as the second embodiment. In the description above, the rear door 92 is a hatchback door. However, the rear door 92 may be a side opening door.

4. Fourth Embodiment

Next, the fourth embodiment is described. The configuration and the processing on an object detection system 10 of the fourth embodiment are substantially the same as the ones of the first embodiment. Thus, the points different from the first embodiment are primarily described. The object detection system 10 of the fourth embodiment includes the function for generating a composite image that shows the periphery of an own vehicle 9 viewed from a virtual viewpoint, in addition to the functions of the object detection system 10 of the first embodiment.

Figure 17:
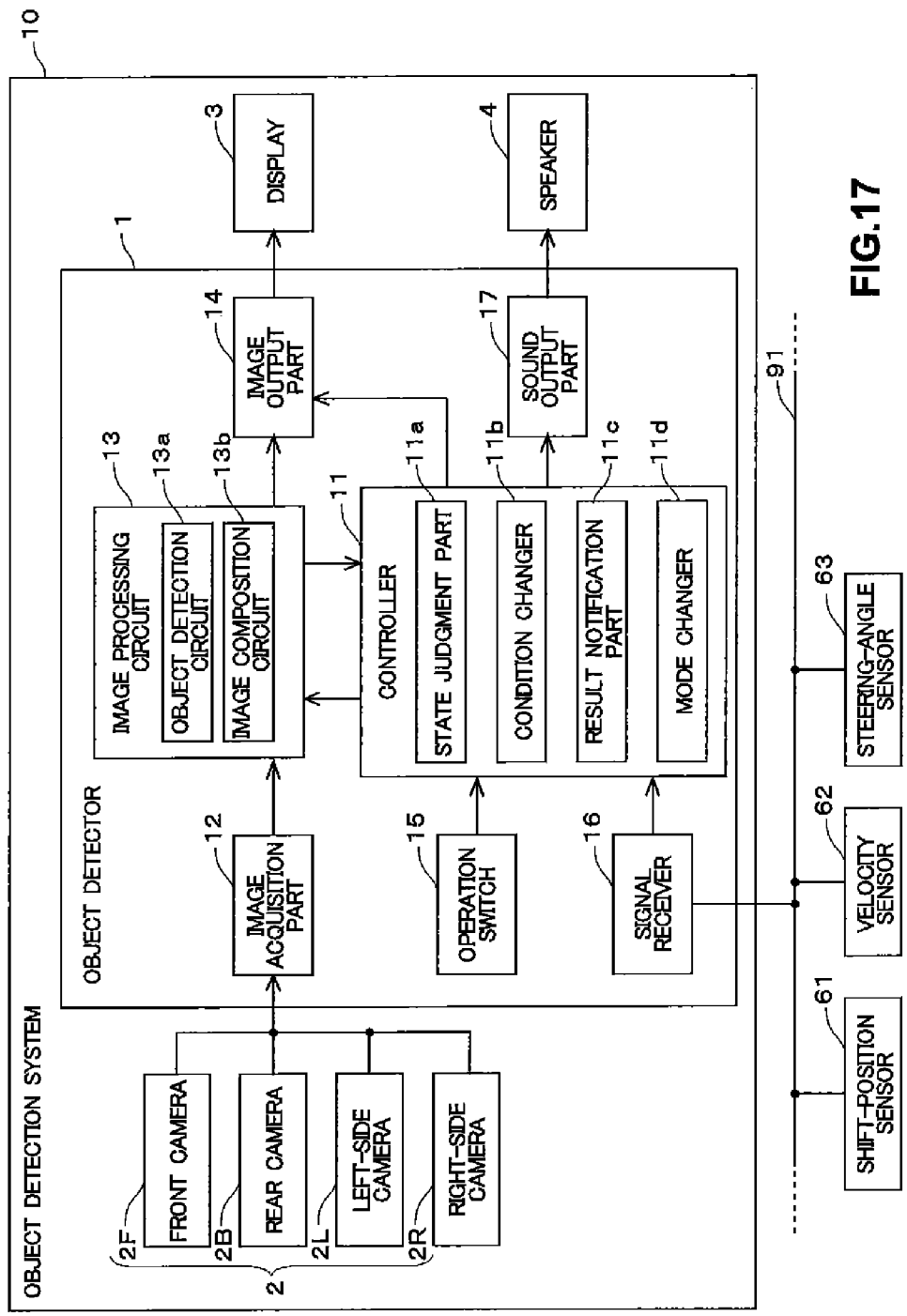
FIG. 17 shows a configuration of an object detection system of the fourth embodiment.

FIG. 17 shows the configuration of the object detection system 10 of the fourth embodiment. As shown in the figure, the object detection system 10 of the fourth embodiment includes four cameras 2. The four cameras 2 include a left-side camera 2L and a right-side camera 2R, in addition to a front camera 2F and a rear camera 2B.

Figure 18:
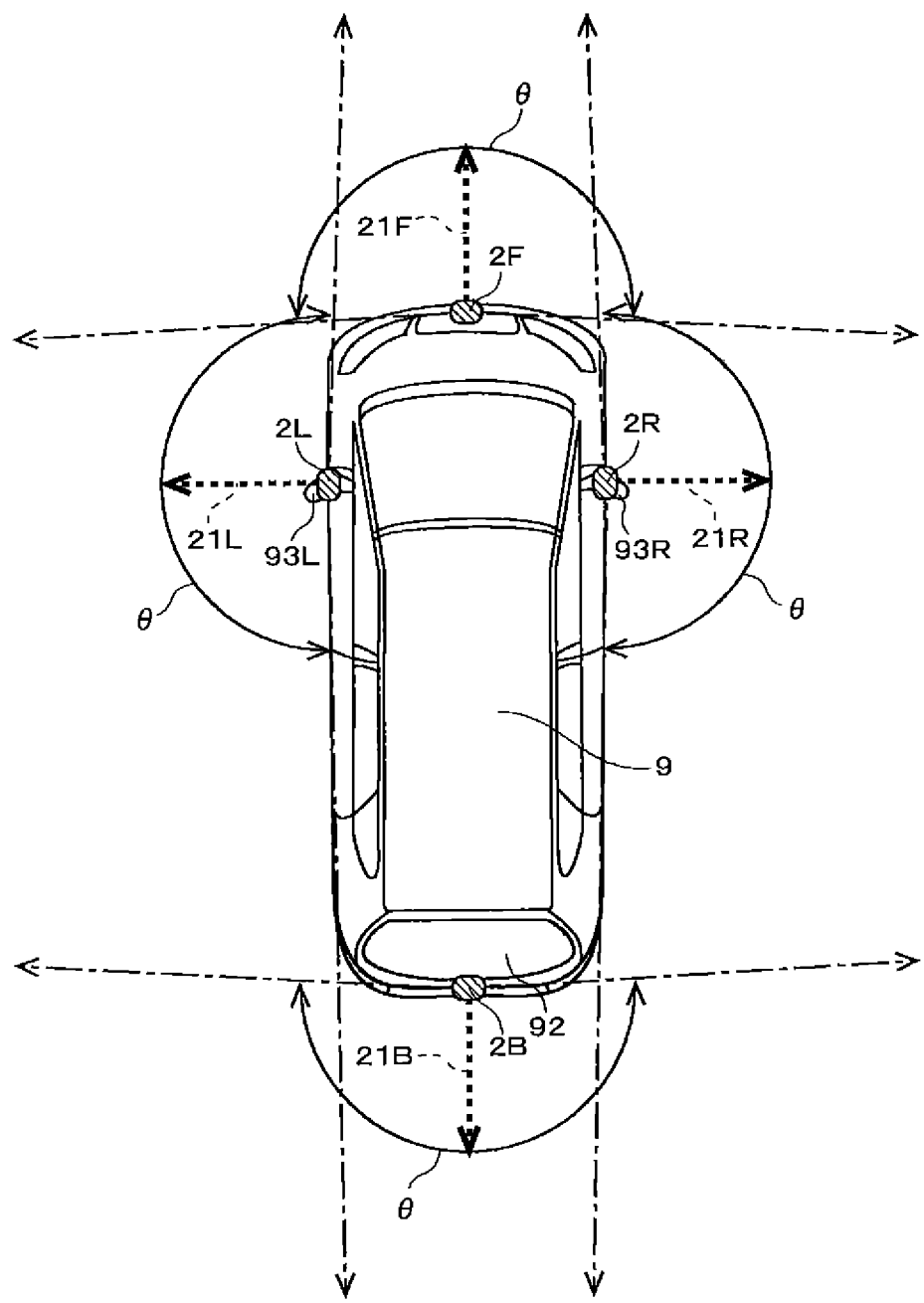
FIG. 18 shows the respective photographing directions of four cameras.

FIG. 18 shows the respective photographing directions of the four cameras 2F, 2B, 2L and 2R. The front camera 2F is disposed on the front end of the own vehicle 9, and the rear camera 2B is disposed on the rear end of the own vehicle 9, in the same as the first embodiment.

The left-side camera 2L is disposed on a left-side mirror 93L that is on the left side of the own vehicle 9, with an optical axis 21L of the left-side camera 2L set at the angle pointing the left direction along the right-left direction of the own vehicle 9. The right-side camera 2R is disposed on a right-side mirror 93R that is on the right side of the own vehicle 9, with an optical axis 21R of the right-side camera 2R set at the angle pointing the right direction along the right-left direction of the own vehicle 9. Each of the cameras 2 having field angle θ of 180 degrees or more. Thus, combination use of the four cameras 2F, 2B, 2L and 2R allows for photographing the whole periphery of the own vehicle 9.

Here is a further description based on FIG. 17. An image processing circuit 13 of the fourth embodiment includes an object detection circuit 13a, and also an image composition circuit 13b that has a function for generating a composite image. The image composition circuit 13b generates the composite image that shows the periphery of the own vehicle 9 viewed from a virtual viewpoint, composed of the four shot images captured by the four cameras 2.

Figure 19:
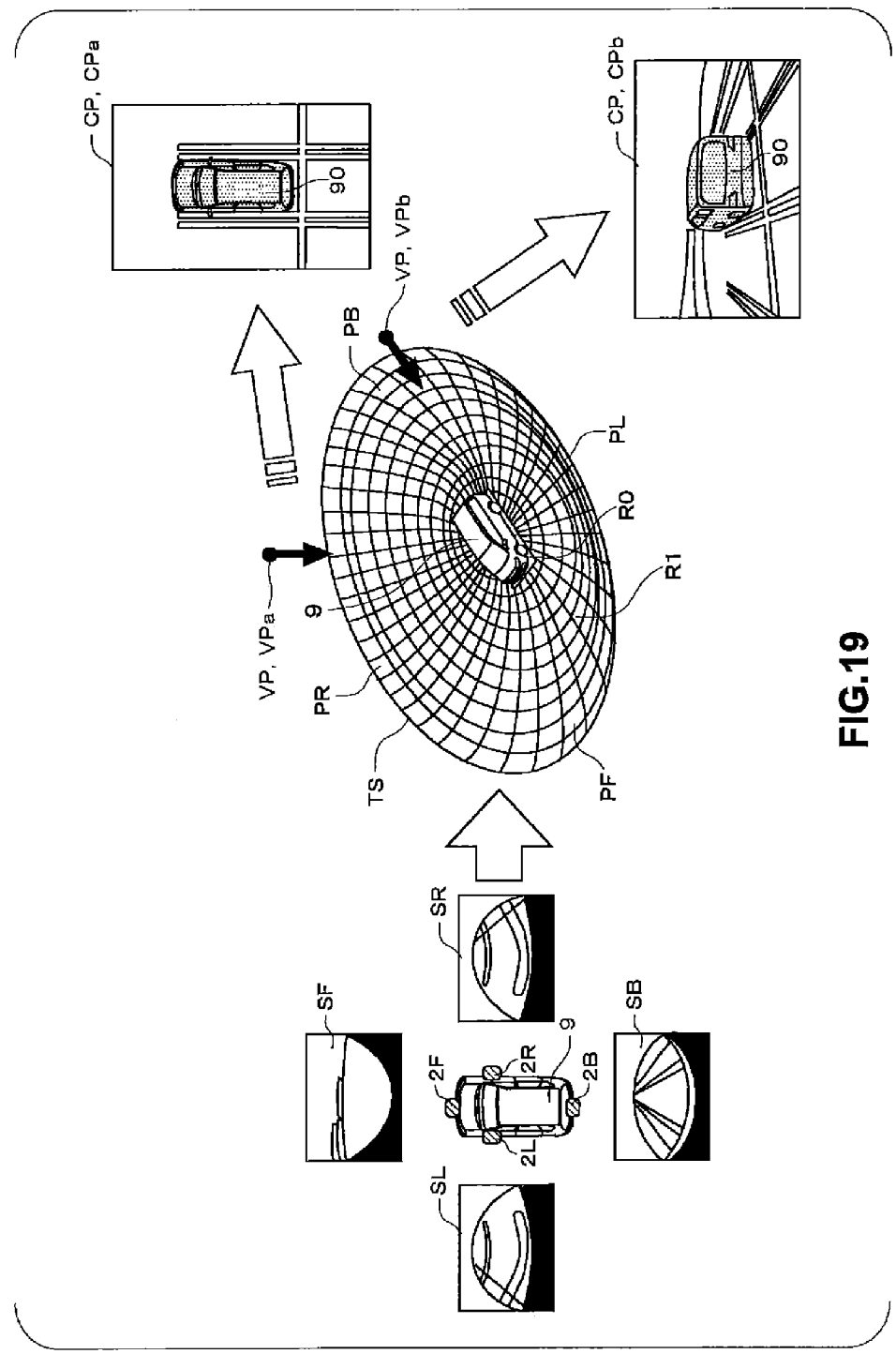
FIG. 19 describes how to generate a composite image.

FIG. 19 describes how the image composition circuit 13b generates the composite image. The front camera 2F, the rear camera 2B, the left-side camera 2L and the right-side camera 2R respectively capture a shot image SF showing the forward area of the own vehicle 9, a shot image SB showing the rear area, a shot image SL showing the left side area, and a shot image SR showing the right side area. The four shot images SF, SB, SL and SR overall include the data covering the whole periphery of the own vehicle 9.

First, the image composition circuit 13b projects the data (each pixel value) included in the four shot images SF, SB, SL and SR onto a three-dimensional curved surface TS that is virtually created in a three-dimensional space. The three-dimensional curved surface TS is the virtual projection surface corresponding to the peripheral area of the own vehicle 9.

The three-dimensional curved surface TS is, for example, in a substantially-hemispherical shape (bowl shape), and its center area (bottom part of the bowl shape) is specified as a vehicle area R0 corresponding to the location of the own vehicle 9. The image composition circuit 13b does not project any data of the shot images onto the vehicle area (location of the own vehicle 9) R0 of the three-dimensional curved surface TS, and projects the data of the shot images onto a projection area R1 that is the outside of the vehicle area R0. Each location of the projection area corresponds to one of the data of the four shot images SF, SB, SL and SR.

The image composition circuit 13*b* projects the data of the four shot images SF, SB, SL and SR respectively onto the corresponding locations of the projection area R1.

The image composition circuit 13*b* projects the data of the shot image SF captured by the front camera 2F onto a part PF corresponding to the forward area of the own vehicle 9 in the projection area R1. The image composition circuit 13*b* also projects the data of the shot image SB captured by the rear camera 2B onto a part PB corresponding to the backward area of the own vehicle 9 in the projection area R1. Moreover, the image composition circuit 13*b* projects the data of the shot image SL captured by the left-side camera 2L onto a part PL corresponding to the left-side area of the own vehicle 9 in the projection area R1, and projects the data of the shot image SR captured by the right-side camera 2R onto a part PR corresponding to the right-side area of the own vehicle 9 in the projection area R1.

After projecting the data of the shot images onto the projection area R1 of the three-dimensional curved surface TS, the image composition circuit 13*b* virtually creates a polygon model showing a three-dimensional shape of the own vehicle 9. The polygon model of the own vehicle 9 is located at the vehicle area R0 that is the location of the own vehicle 9 in the three-dimensional space where the three-dimensional curved surface TS is set.

Next, the image composition circuit 13*b* sets a virtual viewpoint VP in the three-dimensional space. The virtual viewpoint VP is specified with a view direction and a view position. The image composition circuit 13*b* can set in the three-dimensional space the virtual viewpoint VP having an arbitrary view direction at an arbitrary position.

Then, the image composition circuit 13*b* clips, as an image, only the data projected onto the area included in the prescribed view angle viewed from the set virtual viewpoint VP within the three-dimensional curved surface TS. The image composition circuit 13*b* also renders the own vehicle 9 based on the polygon model in accordance with the set virtual viewpoint VP, and superposes on the clipped image a two-dimensional vehicle image 90 that is rendered. As above, the image composition circuit 13*b* generates a composite image CP that shows the own vehicle 9 and the periphery of the own vehicle 9 viewed from the virtual viewpoint VP.

In the case where the view point is a virtual viewpoint VPa that is set straight above the own vehicle 9 with a straight-down view direction as shown in the figure, the image composition circuit 13*b* generates a composite image CPa including the overlooked own vehicle 9 and the overlooked periphery of the own vehicle 9. In the case where the view point is a virtual viewpoint VPb that is set left-rear above the own vehicle 9 to look down the forward area of the own vehicle 9, the image composition circuit 13*b* generates a composite image CPb including the own vehicle 9 and the periphery of the own vehicle 9 overlooked from the left-rear point above the own vehicle 9.

An image output part 14 of the fourth embodiment generates a display image including the composite image CP generated by the image composition circuit 13*b* in addition to a shot image SG to output to a display 3. Thus, a display image 32, as shown in FIG. 20, including the shot image SG and the composite image CP is displayed on the display 3.

The composite image CP included in the display image 32 shows, for example, the overlooked image including the own vehicle 9 and the periphery of the own vehicle 9. The display image 32 also includes two of warning parts AF and an icon C. By viewing the display image 32 as above, a user can easily perceive the direction in which an object approaching the own vehicle 9 exists, and further the whole peripheral area of the own vehicle 9 at the same time.

Figure 20:
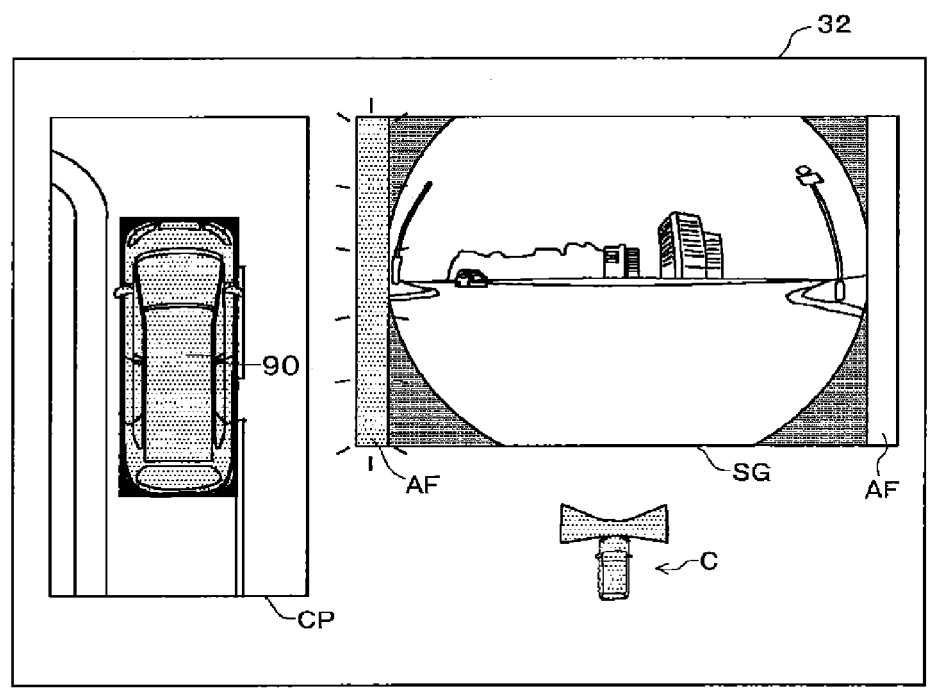
FIG. 20 shows another sample display image.

The form of the display image for display on the display 3 may be changed arbitrarily between the form shown in FIG. 20 and the form shown in FIG. 4 based on a prescribed operation by a user. There may be an operation mode for detecting an object approaching the own vehicle 9 by use of the shot image captured by the left-side camera 2L or the right-side camera 2R.

5. Modification

So far, some embodiments of the invention have been described. However, the invention is not to be considered limited to the described embodiments above, and includes various modifications. Hereafter, these modifications are described. All embodiments including the embodiments described above and the embodiments to be described below can be arbitrarily combined with others.

The object detection circuit 13*a* of the embodiments described above detects an object approaching the own vehicle 9. However, an object detection circuit may detect an object moving apart from an own vehicle 9.

In the embodiments described above, each of the warning parts AF formed in a rectangular functions as an indication for indicating the detection result of the object detection processing. However, another shape such as an arrow may be displayed as an indicator. The image of the detected object in the shot image may be emphasized with a highlight frame or the like to inform a user of the detection result of the object detection processing.

In the above embodiments, the state judgment part 11*a* changes the extraction threshold so as to change whether the detection function of the object detection circuit 13*a* is to be enabled or disabled. However, a state judgment part 11*a* may change another parameter relevant to the detection function so as to change the detection function of an object detection circuit 13*a* is to be enabled or disabled. In an example, a state judgment part 11*a* may change a flag that specifies the output on or off of the detection result by an object detection circuit.

Figure 21:
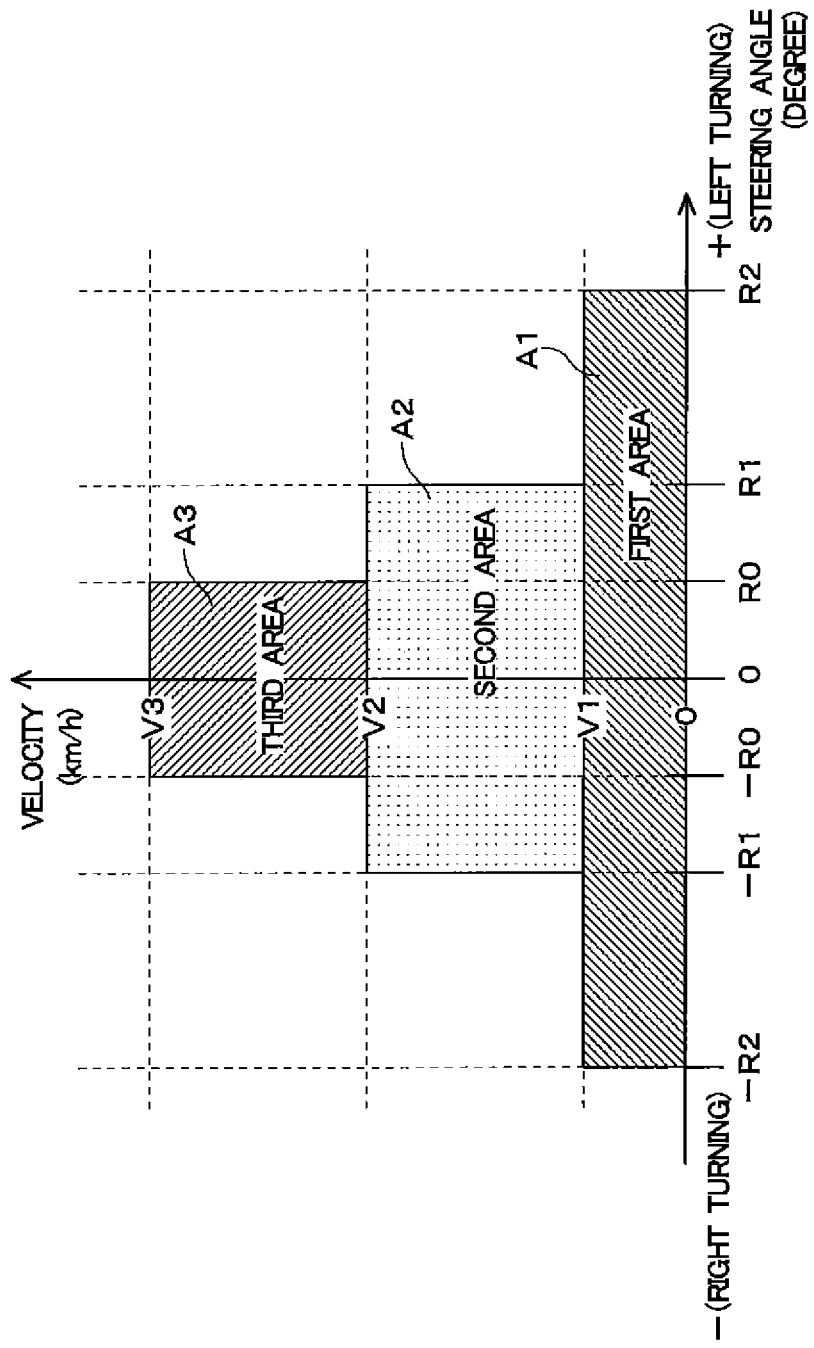
FIG. 21 shows another example of the judgment conditions for judging whether enabling a detection function is acceptable or not.

A state judgment part 11*a* may use another judgment condition that is different from the judgment condition described above as a judgment condition for judging whether enabling the detection function is acceptable or not. FIG. 21 shows one example of another judgment condition for judging whether enabling the detection function is acceptable or not. The graph of FIG. 21 includes a third area A3, in addition to a first area A1 and a second area A2 being the same as the ones of the first embodiment. The third area A3 is the area where the velocity is V2 or above but less than V3, and the absolute value of the steering angle is less than R0 (R0<R1). For example, V3 is 5.0 km/h, and R0 is 120 degrees. A condition changer 11*b* sets the third area A3 as a judgment condition when the velocity of an own vehicle 9 is V2 or above but less than V3. In this case as well, the condition changer 11*b* changes the steering angle range for use as the condition of the steering angle in accordance with the velocity of the own vehicle 9. That is, the smaller the velocity of the own vehicle 9 is, the wider the steering angle range becomes.

In the embodiments described above, the object detection circuit 13*a* detects an object by the optical flow method. However, an object detection circuit 13*a* may detect an object by another frame correlation method such as an inter-frame difference method. The inter-frame difference method compares the pixel values of the two shot images captured at different timings to detect an object based on the area where the difference of the pixel values exists.

An object detection circuit 13a may detect an object by a pattern recognition method such as a template matching method. The template matching method detects an object by finding the area that is similar to a template image in a shot image based on the template images prepared as patterns, showing the appearances of the objects to be detected.

In the embodiments described above, various functions are implemented by software, specifically by processing based on programs. However, some of these functions may be implemented by electrical hardware circuits. Contrarily, some of the functions implemented by hardware circuits in the above descriptions may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. An object detector comprising:
  a detecting circuit that is a hardware circuit and detects, by use of a shot image of a periphery of a vehicle captured by a camera, an object moving in the periphery of the vehicle, the detecting circuit, when enabled, performing a detection function implemented by software that detects the object by a frame correlation method that uses a plurality of shot images acquired at successive times; and
  a controller that (i) acquires information about a vehicle state of the vehicle, the vehicle state including at least one from the group consisting of a velocity of the vehicle, an operation state of an anti-lock breaking system of the vehicle, an open-close state of a rear door of the vehicle where the camera is installed, and a steering angle of the vehicle, and (ii) changes whether the detection function of the detecting circuit is to be enabled or disabled in accordance with the vehicle state by changing a parameter relevant to the detection function so as to change whether the detection function is to be enabled or disabled while keeping the detecting circuit activated.

2. The object detector of claim 1, wherein
  the detecting circuit detects the object when a derived value that is derived from the shot image exceeds a threshold, and
  the controller changes the threshold to a maximum value to disable the detection function.

3. The object detector of claim 1, wherein
  when the vehicle state includes the velocity of the vehicle and the operation state of the anti-lock braking system of the vehicle,
  the controller disables the detection function when the anti-lock braking system is working.

4. The object detector of claim 1, wherein
  when the vehicle state includes the open-close state of the rear door of the vehicle where the camera is installed,
  the controller disables the detection function when the rear door is open.

5. The object detector of claim 1, wherein
  when the vehicle state includes the velocity of the vehicle and the steering angle of the vehicle:
  the detecting circuit detects the object by a frame correlation method that uses a plurality of shot images captured at successive times, and the controller disables the detection function when the steering angle is not within a prescribed steering angle range, and changes the prescribed steering angle range in accordance with the velocity of the vehicle.

6. The object detector of claim 1, wherein the controller outputs a notification that informs a user of a detection result of the detecting circuit.

7. An object detection method comprising the steps of:
  (a) a detector detecting, by use of a shot image of a periphery of a vehicle captured by a camera, an object moving in the periphery of the vehicle, the detector being a hardware circuit and, when enabled, performing a detection function that is implemented by software and detects the object by a frame correlation method that uses a plurality of shot images acquired at successive times;
  (b) a controller acquiring a vehicle state of the vehicle, the vehicle state including at least one from the group consisting of a velocity of the vehicle, an operation state of an anti-lock breaking system of the vehicle, an open-close state of a rear door of the vehicle where the camera is installed, and a steering angle of the vehicle; and
  (c) the controller changing whether the detection function of the detector is to be enabled or disabled in accordance with the vehicle state, wherein
  the controller, in the step (c), changes a parameter relevant to the detection function so as to change whether the detection function is to be enabled or disabled while keeping the detector activated.

8. The object detection method of claim 7, wherein
  the detector detects the object when a derived value that is derived from the shot image exceeds a threshold, and
  the controller, in the step (c), changes the threshold to a maximum value to disable the detection function.

9. The object detection method of claim 7, wherein
  when the vehicle state includes the velocity of the vehicle and the operation state of the anti-lock braking system of the vehicle,
  the controller, in the step (c), disables the detection function when the anti-lock braking system is working.

10. The object detection method of claim 7, wherein
  when the vehicle state includes the open-close state of the a rear door of the vehicle where the camera is installed,
  the controller, in the step (c), disables the detection function when the rear door is open.

11. The object detection method of claim 7, wherein
  when the vehicle state includes the velocity of the vehicle and the steering angle of the vehicle:
  the detector detects the object by a frame correlation method that uses a plurality of the shot images captured at successive times, and
  the controller, in the step (c), disables the detection function when the steering angle is not in a prescribed steering angle range, and changes the prescribed steering angle range in accordance with the velocity of the vehicle.

12. The object detection method of claim 7, further comprising the step of:
  (d) the controller outputting a notification that informs a user of a detection result by the detector.

* * * * *